United States Patent
Arai et al.

[11] Patent Number: 6,052,482
[45] Date of Patent: Apr. 18, 2000

[54] CHARACTER RECOGNITION APPARATUS AND METHOD

[75] Inventors: Tsunekazu Arai, Tama; Eiji Takasu, Yokohama; Hiroto Yoshii, Tokyo, all of Japan

[73] Assignee: Canon Kabushiki Kaisha, Tokyo, Japan

[21] Appl. No.: 08/773,838

[22] Filed: Dec. 27, 1996

[30] Foreign Application Priority Data

Jan. 12, 1996 [JP] Japan ................................. 8-003841

[51] Int. Cl.[7] .................................................. G06K 9/62
[52] U.S. Cl. .................................... 382/187; 382/209
[58] Field of Search .................................. 382/185, 187, 382/188, 189, 190, 192, 209, 214, 219, 227

[56] References Cited

U.S. PATENT DOCUMENTS

| | | | |
|---|---|---|---|
| 4,040,009 | 8/1977 | Kadota et al. | 382/209 |
| 4,607,386 | 8/1986 | Morita et al. | 382/209 |
| 4,975,974 | 12/1990 | Nishijima et al. | 382/209 |
| 5,005,205 | 4/1991 | Ellozy et al. | 382/187 |
| 5,077,805 | 12/1991 | Tan | 382/209 |
| 5,191,622 | 3/1993 | Shojima et al. | 382/185 |
| 5,319,721 | 6/1994 | Chefalas et al. | 382/187 |
| 5,579,408 | 11/1996 | Sakaguchi et al. | 382/187 |
| 5,680,480 | 10/1997 | Beernink et al. | 382/187 |
| 5,687,254 | 11/1997 | Poon et al. | 382/187 |

FOREIGN PATENT DOCUMENTS 62-39460  8/1987  Japan ......................... G06K 9/46

*Primary Examiner*—Yon J. Couso
*Attorney, Agent, or Firm*—Fitzpatrick, Cella, Harper, Scinto

[57] ABSTRACT

A threshold value for identifying similar characters is set at will from a keyboard. It is determined whether a character entered on a character input panel by a pen is a similar character and, if the entered character is judged to be a similar character, a feature quantity of this character is calculated. The calculated feature quality and the set threshold value are compared. On the basis of the comparison, the character determined to be a similar character is identified as being in any of a plurality of character groups of similar characters.

13 Claims, 29 Drawing Sheets

FIG. 3

| SIMILAR CHARACTER CLASSIFICATION NO. | SIMILAR CHARACTER CODE LIST | SIMILAR CHARACTER IDENTIFICATION FUNCTION THRESHOLD VALUE 1 | SIMILAR CHARACTER IDENTIFICATION FUNCTION THRESHOLD VALUE 2 | SIMILAR CHARACTER IDENTIFICATION FUNCTION THRESHOLD VALUE 3 |
|---|---|---|---|---|
| 1 | "かれ" | THRESHOLD VALUE OF "かれ" IDENTIFICATION FUNCTION 1 | | |
| 2 | "ろる" | THRESHOLD VALUE OF "ろる" IDENTIFICATION FUNCTION 1 | | |
| 3 | "UV" | THRESHOLD VALUE OF "UV" IDENTIFICATION FUNCTION 1 | | |
| 4 | "アウ" | THRESHOLD VALUE OF "アウ" IDENTIFICATION FUNCTION 1 | THRESHOLD VALUE OF "アウ" IDENTIFICATION FUNCTION 2 | |
| 5 | "キチ" | THRESHOLD VALUE OF "キチ" IDENTIFICATION FUNCTION 1 | THRESHOLD VALUE OF "キチ" IDENTIFICATION FUNCTION 2 | THRESHOLD VALUE OF "キチ" IDENTIFICATION FUNCTION 3 |

FIG. 4

| SIMILAR CHARACTER CLASSIFICATION NO. | INTERMEDIATE PATTERN 1 OF SIMILAR CHARACTER | INTERMEDIATE PATTERN 2 OF SIMILAR CHARACTER | INTERMEDIATE PATTERN 3 OF SIMILAR CHARACTER | INTERMEDIATE PATTERN 4 OF SIMILAR CHARACTER | INTERMEDIATE PATTERN 5 OF SIMILAR CHARACTER | INTERMEDIATE PATTERN 6 OF SIMILAR CHARACTER |
|---|---|---|---|---|---|---|
| 1 | SIMILAR CHARACTER CLASSIFICATION 1 INTERMEDIATE PATTERN 1 | SIMILAR CHARACTER CLASSIFICATION 1 INTERMEDIATE PATTERN 2 | SIMILAR CHARACTER CLASSIFICATION 1 INTERMEDIATE PATTERN 3 | SIMILAR CHARACTER CLASSIFICATION 1 INTERMEDIATE PATTERN 4 | SIMILAR CHARACTER CLASSIFICATION 1 INTERMEDIATE PATTERN 5 | SIMILAR CHARACTER CLASSIFICATION 1 INTERMEDIATE PATTERN 6 |
| 2 | SIMILAR CHARACTER CLASSIFICATION 2 INTERMEDIATE PATTERN 1 | SIMILAR CHARACTER CLASSIFICATION 2 INTERMEDIATE PATTERN 2 | SIMILAR CHARACTER CLASSIFICATION 2 INTERMEDIATE PATTERN 3 | SIMILAR CHARACTER CLASSIFICATION 2 INTERMEDIATE PATTERN 4 | SIMILAR CHARACTER CLASSIFICATION 2 INTERMEDIATE PATTERN 5 | SIMILAR CHARACTER CLASSIFICATION 2 INTERMEDIATE PATTERN 6 |
| 3 | SIMILAR CHARACTER CLASSIFICATION 3 INTERMEDIATE PATTERN 1 | SIMILAR CHARACTER CLASSIFICATION 3 INTERMEDIATE PATTERN 2 | SIMILAR CHARACTER CLASSIFICATION 3 INTERMEDIATE PATTERN 3 | SIMILAR CHARACTER CLASSIFICATION 3 INTERMEDIATE PATTERN 4 | SIMILAR CHARACTER CLASSIFICATION 3 INTERMEDIATE PATTERN 5 | SIMILAR CHARACTER CLASSIFICATION 3 INTERMEDIATE PATTERN 6 |
| 4 | SIMILAR CHARACTER CLASSIFICATION 4 INTERMEDIATE PATTERN 1 | SIMILAR CHARACTER CLASSIFICATION 4 INTERMEDIATE PATTERN 2 | SIMILAR CHARACTER CLASSIFICATION 4 INTERMEDIATE PATTERN 3 | SIMILAR CHARACTER CLASSIFICATION 4 INTERMEDIATE PATTERN 4 | SIMILAR CHARACTER CLASSIFICATION 4 INTERMEDIATE PATTERN 5 | SIMILAR CHARACTER CLASSIFICATION 4 INTERMEDIATE PATTERN 6 |
| 5 | SIMILAR CHARACTER CLASSIFICATION 5 INTERMEDIATE PATTERN 1 | SIMILAR CHARACTER CLASSIFICATION 5 INTERMEDIATE PATTERN 2 | SIMILAR CHARACTER CLASSIFICATION 5 INTERMEDIATE PATTERN 3 | SIMILAR CHARACTER CLASSIFICATION 5 INTERMEDIATE PATTERN 4 | SIMILAR CHARACTER CLASSIFICATION 5 INTERMEDIATE PATTERN 5 | SIMILAR CHARACTER CLASSIFICATION 5 INTERMEDIATE PATTERN 6 |

FIG. 5

| SIMILAR CHARACTER CLASSIFICATION NO. 1 INTERMEDIATE PATTERN 1 | SIMILAR CHARACTER CLASSIFICATION NO. 1 INTERMEDIATE PATTERN 2 | SIMILAR CHARACTER CLASSIFICATION NO. 1 INTERMEDIATE PATTERN 3 |
|---|---|---|
| 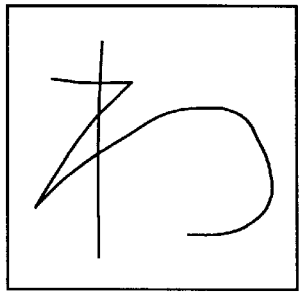 | 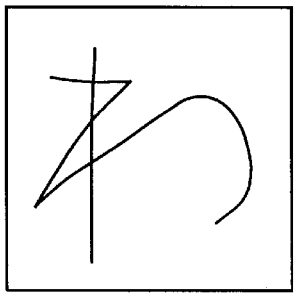 | 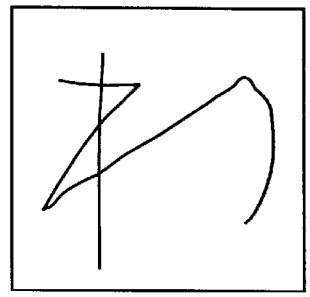 |
| SIMILAR CHARACTER CLASSIFICATION NO. 1 INTERMEDIATE PATTERN 4 | SIMILAR CHARACTER CLASSIFICATION NO. 1 INTERMEDIATE PATTERN 5 | SIMILAR CHARACTER CLASSIFICATION NO. 1 INTERMEDIATE PATTERN 6 |
| 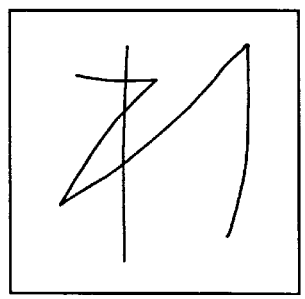 | 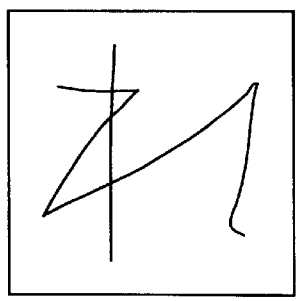 | 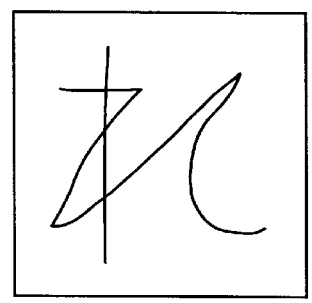 |

AA

BB

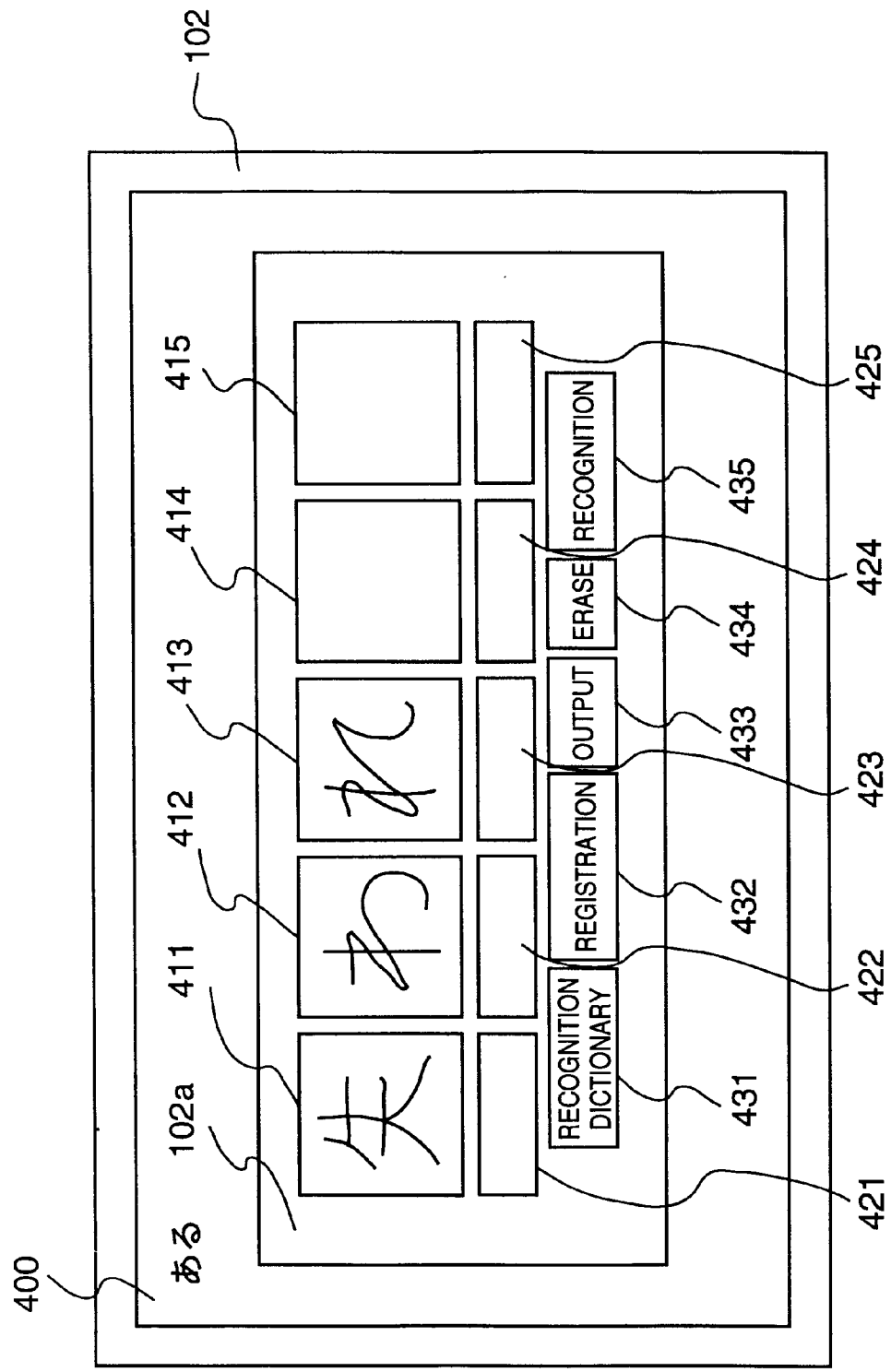

F I G. 20

| SIMILAR CHARACTER CLASSIFICATION NO. | INTERMEDIATE PATTERN 1 OF SIMILAR CHARACTER | INTERMEDIATE PATTERN 2 OF SIMILAR CHARACTER |
|---|---|---|
| 1 | SIMILAR CHARACTER CLASSIFICATION 1 STANDARD PATTERN OF "わ" | SIMILAR CHARACTER CLASSIFICATION 1 STANDARD PATTERN OF "れ" |
| 2 | SIMILAR CHARACTER CLASSIFICATION 2 STANDARD PATTERN OF "3" | SIMILAR CHARACTER CLASSIFICATION 2 STANDARD PATTERN OF "ろ" |

FIG. 23

SIMILAR CHARACTER CLASSIFICATION NO.3 INTERMEDIATE PATTERN 1
SIMILAR CHARACTER CLASSIFICATION NO.3 INTERMEDIATE PATTERN 2
SIMILAR CHARACTER CLASSIFICATION NO.3 INTERMEDIATE PATTERN 3

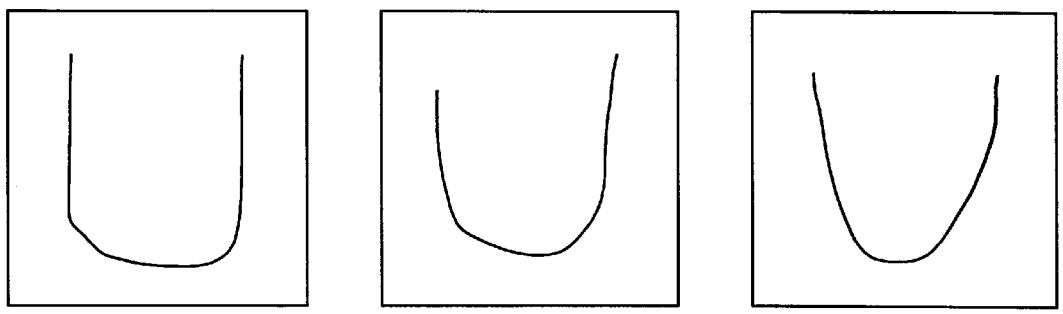

SIMILAR CHARACTER CLASSIFICATION NO.3 INTERMEDIATE PATTERN 4
SIMILAR CHARACTER CLASSIFICATION NO.3 INTERMEDIATE PATTERN 5
SIMILAR CHARACTER CLASSIFICATION NO.3 INTERMEDIATE PATTERN 6

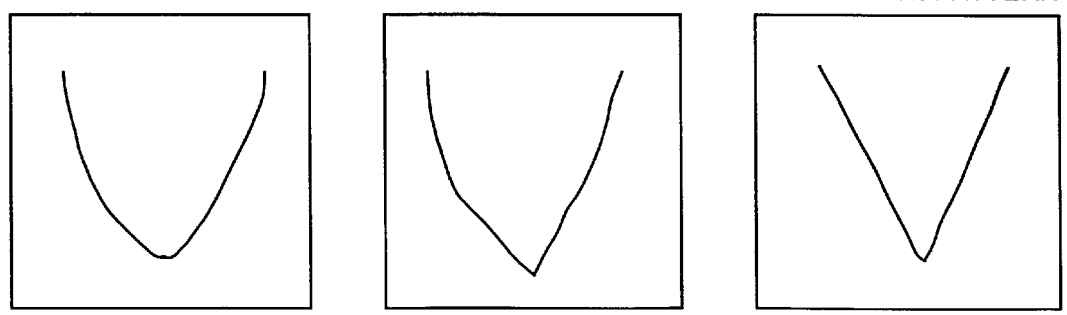

CHARACTER RECOGNITION APPARATUS AND METHOD

BACKGROUND OF THE INVENTION

This invention relates to an apparatus and method for recognizing entered characters.

A conventional apparatus for recognizing handwritten characters compares the stroke pattern of an entered handwritten character with the stroke patterns of a recognition dictionary storing the strike patterns of standard characters, finds the character code that corresponds to the best matching stroke pattern based upon the results of comparison and outputs this character code as the result of recognition. When similar handwritten characters whose stroke patterns are not very different from each other, such as the characters "3" and "る" (the latter of which is a hiragana character), have been entered, the portions of these similar characters that differ from each other are extracted as feature quantities. An extracted feature quantity is compared with a predetermined threshold value (calculated based upon the stroke patterns of standard characters) that is for identifying similar characters, thereby making it possible to identify similar characters.

Depending upon the user, there are occasions where the entered stroke pattern of a handwritten character differs greatly from the stroke patterns of standard characters. Depending upon the user, therefore, instances arise in which an entered character cannot be recognized. Accordingly, a user dictionary is created by registering the stroke patterns of handwritten characters entered by the user, the features of these stroke patterns and the corresponding character codes. Comparing the stroke patterns registered in the user dictionary and the stroke patterns of entered handwritten patterns makes feasible the recognition of stroke patterns of handwritten characters that differ greatly from the stroke patterns of standard characters.

With the conventional handwritten character recognition apparatus of the kind described above, however, the identification of similar characters is carried out by comparing feature quantities obtained from the similar characters and predetermined threshold values (feature quantities) established in advance. Consequently, if the feature quantities obtained from similar characters entered by a user are not of a uniform nature, the identification of similar characters cannot be performed accurately.

Further, in case of character recognition employing a user dictionary, only the stroke patterns of entered handwritten characters and their features are registered in the dictionary. Even if similar characters are present among the characters registered, extraction of features that takes into account the identification of one similar character from another is not carried out. Consequently, not only is there no improvement in the precision of recognition of similar handwritten characters but there are also cases in which similar characters cannot be recognized at all.

SUMMARY OF THE INVENTION

Accordingly, an object of the present invention is to provide a character recognition apparatus and method capable of improving the precision with which similar characters are identified and of recognizing entered handwritten characters more accurately.

According to the present invention, the foregoing objects are attained by providing a character recognition apparatus for recognizing an entered character, comprising setting means for setting at will a threshold value for identifying similar characters, judging means for judging whether the entered character is a similar character, calculating means for calculating a feature quantity of the entered character if the judging means has judged that the entered character is a similar character, comparison means for comparing the feature quantity calculated by the calculating means and the threshold value set by the setting means, and identifying means for identifying, based upon the results of the comparison by the comparison means, in which of a plurality of character groups of the similar character a character judged to be the similar character belongs.

In a preferred embodiment, the apparatus further comprises output means for outputting a character code that corresponds to a character identified by the identifying means.

In a preferred embodiment, the setting means includes memory means for storing a group of intermediate patterns of similar characters, in which the feature quantity calculated by the calculating means is changed in stages, display means for displaying the group of intermediate patterns, and selecting means for selecting any intermediate pattern from the group of intermediate patterns displayed on the display means, wherein the feature quantity of the intermediate pattern selected by the selecting means is calculated using the calculating means, and the calculated feature quantity is set as a threshold value. Since a character judged to be a similar character can be identified based upon the feature quantity of the selected intermediate pattern, similar characters can be identified more accurately.

In a preferred embodiment, the judging means includes acquisition means for recognizing an entered character and acquiring a character code that corresponds to the recognized character, and collating means for collating the character code acquired by the acquisition means and a character code corresponding to each character of a plurality of character groups of similar characters, wherein it is determined whether the entered character is a similar character based upon results of collation performed by the collating means.

In a preferred embodiment, the setting means includes input means for allowing a user to enter a handwritten similar character, wherein a feature quantity of the handwritten similar character entered by the user is calculated by the calculating means and the calculated feature quantity is set as a threshold value. Since the feature quantity of a handwritten similar character entered by the user can be set as a threshold value, a handwritten similar character entered by the user can be identified more accurately.

In a preferred embodiment, the input means has display means for displaying, in superimposed form, a plurality of character groups that are judged to be similar characters by the judging means, wherein the handwritten similar character is entered on a plurality of character groups of the similar characters displayed in superimposed form on the display means.

According to the present invention, the foregoing object is attained by providing a character recognition method of recognizing an entered character, comprising a setting step of setting a desired threshold value for identifying similar characters, a judging step of judging whether the entered character is a similar character, a calculating step of calculating a feature quantity of the entered character if result of judgment at the judging step is that the entered character is a similar character, a comparison step of comparing the feature quantity calculated at the calculating step and the threshold value set at the setting step, and an identifying step of identifying, based upon the results of the comparison at the comparison step, in which of a plurality of character groups of the similar character a character judged to be the similar character belongs.

In a preferred embodiment, the method further comprises an output step of outputting a character code that corresponds to a character identified at the identifying step.

In a preferred embodiment, the setting step includes a storing step of storing a group of intermediate patterns of similar characters on a storage medium, in which the feature quantity calculated at the calculating step is changed in stages from one intermediate pattern to the next, a display step of displaying the group of intermediate patterns, and a selecting step of selecting any intermediate pattern from the group of intermediate patterns displayed at the display step, wherein the feature quantity of the intermediate pattern selected at the selecting step is calculated using the calculating step, and the calculated feature quantity is set as a threshold value.

In a preferred embodiment, the judging step includes an acquisition step of recognizing an entered character and acquiring a character code that corresponds to the recognized character, and a collating step of collating the character code acquired at the acquisition step and a character code corresponding to each character of a plurality of character groups of similar characters, wherein it is determined whether the entered character is a similar character based upon results of collation performed at the collating step.

In a preferred embodiment, the setting step includes an input step of allowing a user to enter a handwritten similar character, wherein a feature quantity of the handwritten similar character entered by the user is calculated at the calculating step and the calculated feature quantity is set as a threshold value.

In a preferred embodiment, the input step has a display step of displaying, in superimposed form, a plurality of character groups that are judged to be similar characters at the judging step, wherein the handwritten similar character is entered on a plurality of character groups of the similar characters displayed in superimposed form at the display step.

According to the present invention, the foregoing object is attained by providing a computer readable memory for storing program codes of a character recognition processing program, comprising a program code of a setting step of setting a desired threshold value for identifying similar characters, a program code of a judging step of judging whether the entered character is a similar character, a program code of a calculating step of extracting a feature quantity of the entered character if result of judgment at the judging step is that the entered character is a similar character, a program code of a comparison step of comparing the feature quantity calculated at the calculating step and the threshold value set at the setting step, and a program code of an identifying step of identifying, based upon the results of the comparison at the comparison step, in which of a plurality of character groups of the similar character a character judged to be the similar character belongs.

In accordance with the present invention, as described above, it is possible to provide a character recognition apparatus and method capable of improving the precision with which similar characters are identified and of recognizing entered handwritten characters more accurately.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing the structural details of a similar character table according to the first embodiment of the present invention;

FIG. 4 is a diagram illustrating types of intermediate patterns of similar characters according to the first embodiment of the present invention;

FIG. 5 is a diagram illustrating one intermediate pattern group of similar characters from FIG. 4 according to the first embodiment of the present invention;

FIG. 7 is a diagram illustrating the manner in which handwritten characters are entered on a character input panel according to the first embodiment of the present invention;

FIG. 20 is a diagram showing the intermediate patterns of similar characters stored in a similar character table according to the second embodiment of the present invention;

FIG. 23 is a diagram illustrating one group of intermediate patterns of similar characters in FIG. 4;

DESCRIPTION OF THE PREFERRED EMBODIMENTS

Preferred embodiments of the present invention will now be described in detail with reference to the drawings.

Figure 1:
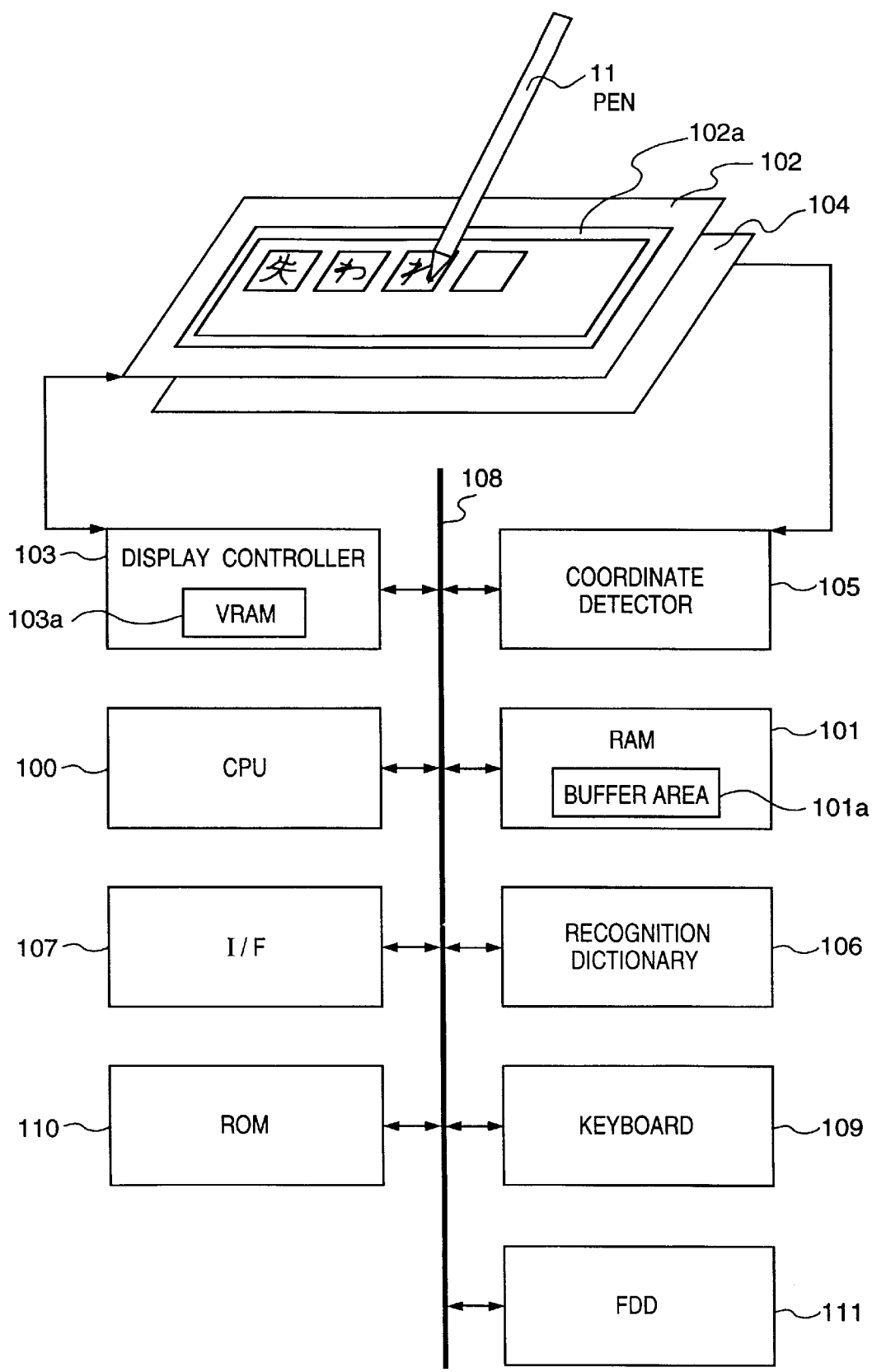
FIG. 1 is a block diagram illustrating the construction of a handwritten character recognition apparatus according to a first embodiment of the present invention.

FIG. 1 is a block diagram illustrating the construction of a handwritten character recognition apparatus according to a first embodiment of the present invention.

As shown in FIG. 1, the apparatus includes a CPU 100 for controlling the overall apparatus in accordance with a control program (for character recognition processing, etc.) and data that have been stored in a ROM 110. In addition to the control program, the flowchart of which will be described later, character font patterns are stored in the ROM 110. The apparatus further includes a RAM 101 which, besides being used as the work area of the CPU 100, stores entered character stroke data and the like. The RAM 101 is internally provided with buffer areas 101a the number of which is the same as the number of character frames on a character input panel 102a displayed on a display unit 102. The buffer areas 101a store stroke information representing characters entered in the character frames, character codes obtained from the results of recognizing these characters, character candidates selected as result of recognition and standard patterns of characters that have been retrieved.

The apparatus according to the first embodiment is capable not only of merely recognizing a character entered in each character frame on the character input panel 102a and converting the character to a standard character but also of executing an application program for text editing or the like based upon the character resulting from the input.

The display unit 102, which is composed of a liquid crystal panel or the like, displays data entered from a keyboard 109 and presents a display of the character input panel 102a that allows a user to under handwritten characters by a pen 11. A display controller 103 controls the display on the display unit 102 in accordance with control executed by the CPU 100. The display controller 103 incorporates a memory (VRAM 103a) for painting character patterns and the paths of entered strokes. A transparent coordinate detection panel 104 is situated in back of the display unit 102. A coordinate detection unit 105 detects a position designated by the pen 11 in a character frame on the character input panel 102a as well as pen-up/pen-down information. A recognition dictionary 106 is used to recognize the character that has been entered in the character frame. An interface (I/F) 107, which connects the apparatus to a device such as a printer or external storage unit, is capable of sending and receiving data. The keyboard 109 is for entering character codes and the like and for specifying instructions such as execution of character recognition processing. A system bus 108 interconnects the components constructing the apparatus.

A floppy disk drive (FDD) 111 accommodates a loaded floppy disk and is capable of writing data to and reading data from the floppy disk. A program whose processing flowchart is described later can be written to the loaded floppy disk (not shown), and the program can then be read into the RAM 101 of the apparatus.

The functional elements of the processing implemented in the first embodiment will be described with reference to FIG. 2.

It should be noted that the control program stored in ROM 110 for executing the processing described in the first embodiment is read in the RAM 101 and then executed under the control of the CPU 100.

Figure 2:
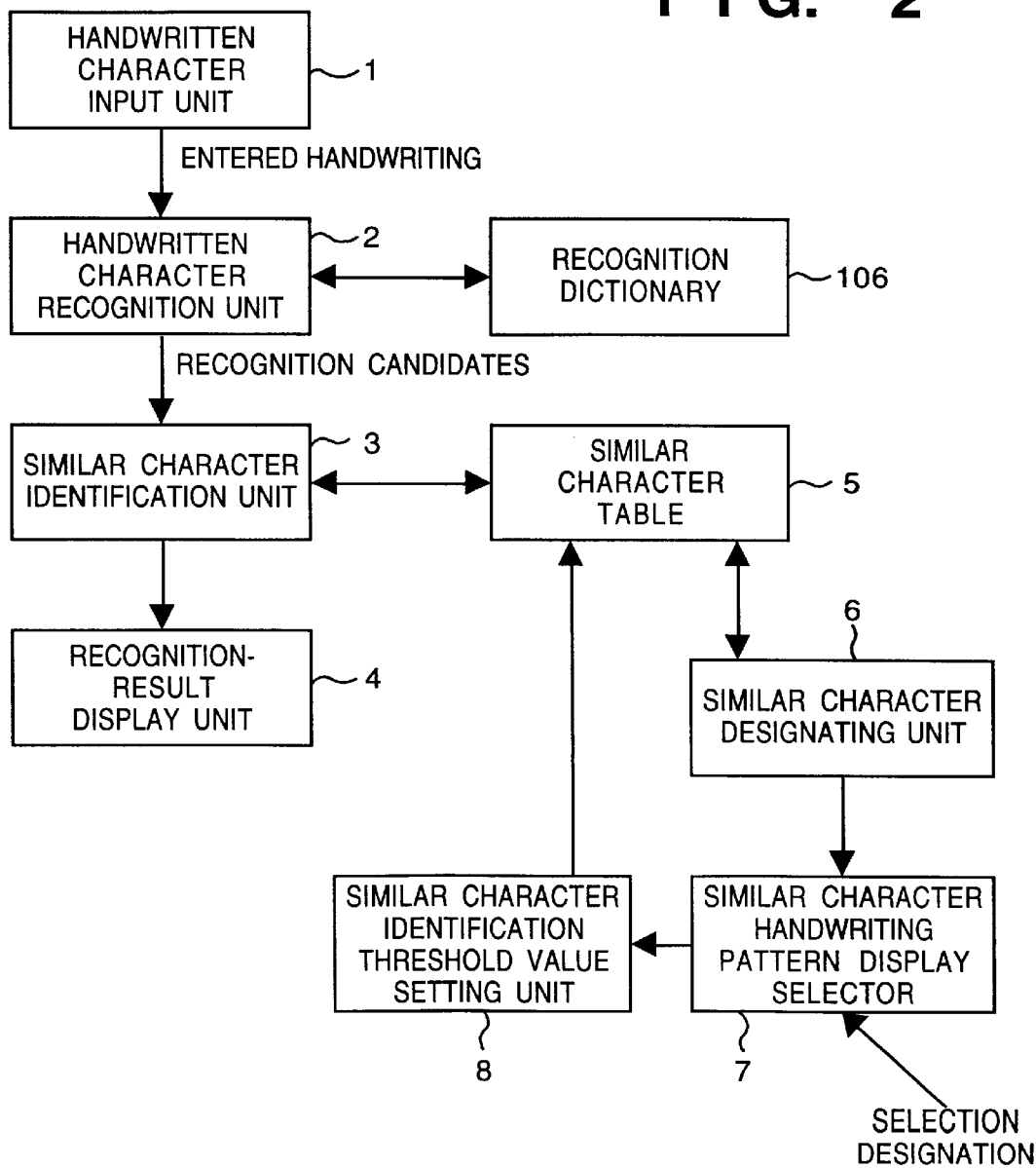
FIG. 2 is a block diagram illustrating the functional construction of the handwritten character recognition apparatus according to the first embodiment of the present invention.

FIG. 2 is a block diagram illustrating the functional construction of the handwritten character recognition apparatus according to the first embodiment.

As shown in FIG. 2, a handwritten character input unit 1 enters handwritten characters in the character frames of the character input panel 102a using the pen 11. A handwritten character recognition unit 2, which uses the recognition dictionary 106 storing the strokes of a plurality of standard characters, collates the strokes of a handwritten character entered by the handwritten character input unit 1 and the strokes of standard characters stored in the recognition dictionary 106. This is done in accordance with a feature-point character recognition algorithm described in Japanese Patent Publication No. 62-39460. On the basis of the results of collation, the corresponding character code is outputted as the recognition candidate of the handwritten character. In case of handwritten characters whose forms resemble each other, such as the numeral "3" and the hiragana character "ろ" (such characters shall be referred to as "similar characters" below), the character codes that correspond to respective ones of similar character groups serving as recognition candidates for handwritten characters are outputted as a row of character codes.

If a similar characters have been recognized in the handwritten character recognition unit 2, a similar character identification unit 3 performs identification processing for rearranging the recognition candidate groups of the similar characters in the order of decreasing recognition rate. An overview of the identification processing executed by the similar character identification unit 3 is as follows: First, it is determined whether a recognition candidate of a handwritten character outputted by the handwritten character recognition unit 2 is present in a similar character table 5. If it is determined that the candidate is not present in the character table, this recognition candidate is sent to a recognition-result display unit 4 as is. On the other hand, if it is determined that the candidate is present in the character table, a similar character identification function threshold value (the details of which will be described later) for the similar character present in the similar character table 5 is compared with a similar character identification function threshold value obtained by calculation based upon an identification function (the details of which will be described later) regarding the strokes of the entered handwritten character. Recognition candidates of the similar character are rearranged in the order of decreasing recognition rate in accordance with the results of the comparison, and the rearranged recognition candidates are sent to the recognition-result display unit 4.

The recognition-result display unit 4 displays character codes of standard characters corresponding to recognition candidates of characters recognized by the handwritten character recognition unit 2 or similar character identification unit 3.

A similar character designating unit 6 designates the type of similar character recognized by the handwritten character recognition unit 2. A classification number corresponding to a designated similar character is sent to a similar character handwriting pattern display selector 7. The latter displays intermediate patterns, which are stroke patterns that are intermediate the respective strokes between designated similar characters. Further, the similar character handwriting pattern display selector 7 selects a display intermediate pattern and sends the selected intermediate pattern to a similar character identification threshold value setting unit 8. The latter decides a threshold value obtained by calculation based upon an identification function regarding a stroke constituted by the intermediate pattern sent. The threshold value decided is set in a predetermined area of a corresponding similar character in the similar character table 5.

The structure of the similar character table 5 will be described with reference to FIG. 3.

In general, an ordinary character recognition algorithm is such that characters are recognized by comparing each of a plurality of recognition candidates with the overall shape of an entered character. Consequently, even if "わ", which is similar to the character "れ", has been entered by handwriting, there will be instances where, depending upon the overall shape of the entered character, "れ" is outputted as the first recognition candidate and "わ" as the second recognition candidate. Similarly, even in a case where "V" has been entered by handwriting, there will be instances where "U" is outputted as the first recognition candidate and "V" as the second recognition candidate. Accordingly, in the first embodiment of the invention, the similar character table 5 which stores the information linking similar characters is used to improve the recognition rate of similar characters. The table makes it possible to identify, in greater detail, similar characters that are very likely to be recognized erroneously by the handwritten character recognition unit 2.

The details of the similar character table 5 will now be described.

As shown in FIG. 3, one group of similar characters is composed of a "Similar Character Classification No." field, a "Similar Character Code List" field and a plurality of "Similar Character Identification Function Threshold Value n" fields, where n represents a positive integer. A number for distinguishing the similar character group is stored in the "Similar Character Classification No." field. The character codes of similar characters that require more detailed identification are stored in the "Similar Character Code List" field with regard to a recognition candidate recognized by the handwritten character recognition unit 2. The character codes are ordinary JIS codes. For example, in the case of Similar Character Classification No. 1, the character codes for "わ" and "れ" are stored. In the case of Similar Character Classification No. 3, the character codes for "U" and "V" are stored.

A similar character identification function threshold value, which is obtained by calculation based upon the identification function regarding an intermediate pattern between similar characters, and a number for distinguishing this intermediate pattern, are stored in the "Similar Character Identification Function Threshold Value n" field. There may be one similar character identification function threshold value or a plurality thereof, depending upon the similar character group.

It should be noted that when the apparatus starts being used, the similar character identification function threshold value of an ordinary mean value is registered in the "Similar Character Identification Function Threshold Value n" field of the similar character table 5 as an initial value.

The following description will be rendered with regard to the similar characters "わ" and "れ" stored in the similar character table 5 as the similar character classification number 1.

Intermediate patterns of similar characters and the types thereof will be described with reference to FIGS. 4 and 5.

An intermediate pattern is a stroke pattern intermediate two similar characters. A desired intermediate pattern is selected by the user and a similar character is identified based upon a similar character identification function threshold value obtained by calculation based upon the identification function regarding the selected intermediate pattern. Identification of a similar character and an improvement in the identification rate thereof can be realized by this identification based upon the intermediate pattern. Further, by newly registering a stroke pattern entered by the user as an intermediate pattern, identification of a similar character in accordance with the handwriting of the user can be realized.

FIG. 4 is a diagram illustrating types of intermediate patterns of similar characters according to the first embodiment of the present invention, and FIG. 5 is a diagram showing one intermediate pattern group of the similar characters.

As shown in FIG. 4, which serves as one example, an intermediate pattern group for one similar character is composed of fields "Intermediate Pattern 1 of Similar Character"~"Intermediate Pattern 6 of Similar Character", which store the strokes of six intermediate patterns, so as to correspond to similar characters indicated by the number in the "Similar Character Classification No." field.

For example, in a case where the number in the "Similar Character Classification No." field is "1", i.e., in a case where the similar characters are "わ" and "れ", intermediate patterns of the kind shown in FIG. 5 are stored in the fields "Intermediate Pattern 1 of Similar Character"~"Intermediate Pattern 6 of Similar Character". First, intermediate pattern 1 of similar character classification number 1 is stored as the stroke pattern of the standard "わ" in the "Intermediate Pattern 1 of Similar Character " field and intermediate pattern 1 of similar character classification number 1 is stored as the stroke pattern of the standard "れ" in the "Intermediate Pattern 6 of Similar Character" field. Further, intermediate patterns that gradually change from "わ" in the "Intermediate Pattern 1 of Similar Character" field to "れ" in the "Intermediate Pattern 6 of Similar Character" are stored in the respective fields from the "Intermediate Pattern 2 of Similar Character" field to the "Intermediate Pattern 5 of Similar Character" field.

Though there are six intermediate patterns stored in the similar character table 5 in the first embodiment, the number of intermediate pattern groups stored is not limited to this number.

A method of calculating a similar character identification function threshold value obtained using an identification function will be described with reference to FIGS. 6A and 6B.

Figure 6A:
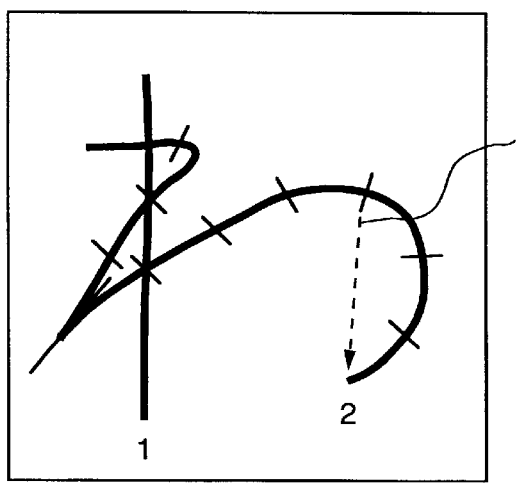
FIGS. 6A and 6B are diagrams for describing a method of calculating a similar character identification function threshold value according to the first embodiment of the present invention.
Figure 6B:
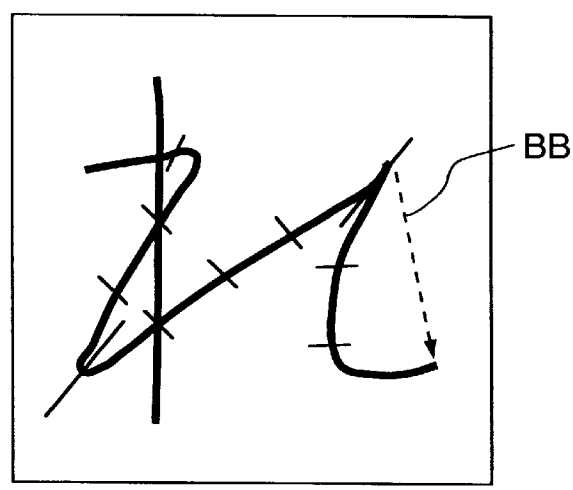

FIGS. 6A and 6B are diagrams for describing a method of calculating a similar character identification function threshold value according to the first embodiment of the present invention.

In order to identify strokes that are similar to each other, an identification function extracts some strokes serving as identification features of each of the similar characters and calculates the direction vectors of the extracted strokes. The function identifies the similar characters based upon the calculated direction vectors.

For example, in a case where handwritten characters entered in the character frames are the similar characters "わ" and "れ", as shown in FIGS. 6A and 6B, calculation based upon the identification function for these similar characters is carried out. Specifically, the distance of the second stroke of the entered handwriting pattern which appears to be "わ" or "れ" is divided up into 11 equal segments. The angle of the direction of the direction vector obtained by connecting the coordinates of the ninth segment and the coordinates of the 11th segment (the coordinates of the end point) is calculated.

As for the meaning of the angle of direction, the direction indicating the upper end in FIG. 6 is adopted as a reference (i.e., the angle of the direction in this case is 0°) and the angle defined by this reference and the calculated direction vector is taken as the angle of the direction.

Let the angle of the direction of a direction vector AA in FIG. 6A be 181°, and let the angle of the direction of a direction vector BB in FIG. 6B be 150°. A threshold value that is the boundary point of direction angles of direction vectors is set in order to distinguish between "わ" and "れ". For example, if the threshold value has been set to 181°, "わ" is recognized in a case where the angle of the direction is 181° or greater and "れ" is recognized in a case where the angle of the direction is less than 181°. Therefore, in accordance with the calculated value of the direction angle of the direction vector, "わ" is recognized as the stroke pattern of FIG. 6A and "れ" is recognized as the stroke pattern of FIG. 6B.

The operation for entering handwritten characters by the user will now be described with reference to FIGS. 7 through 9.

Figure 8:
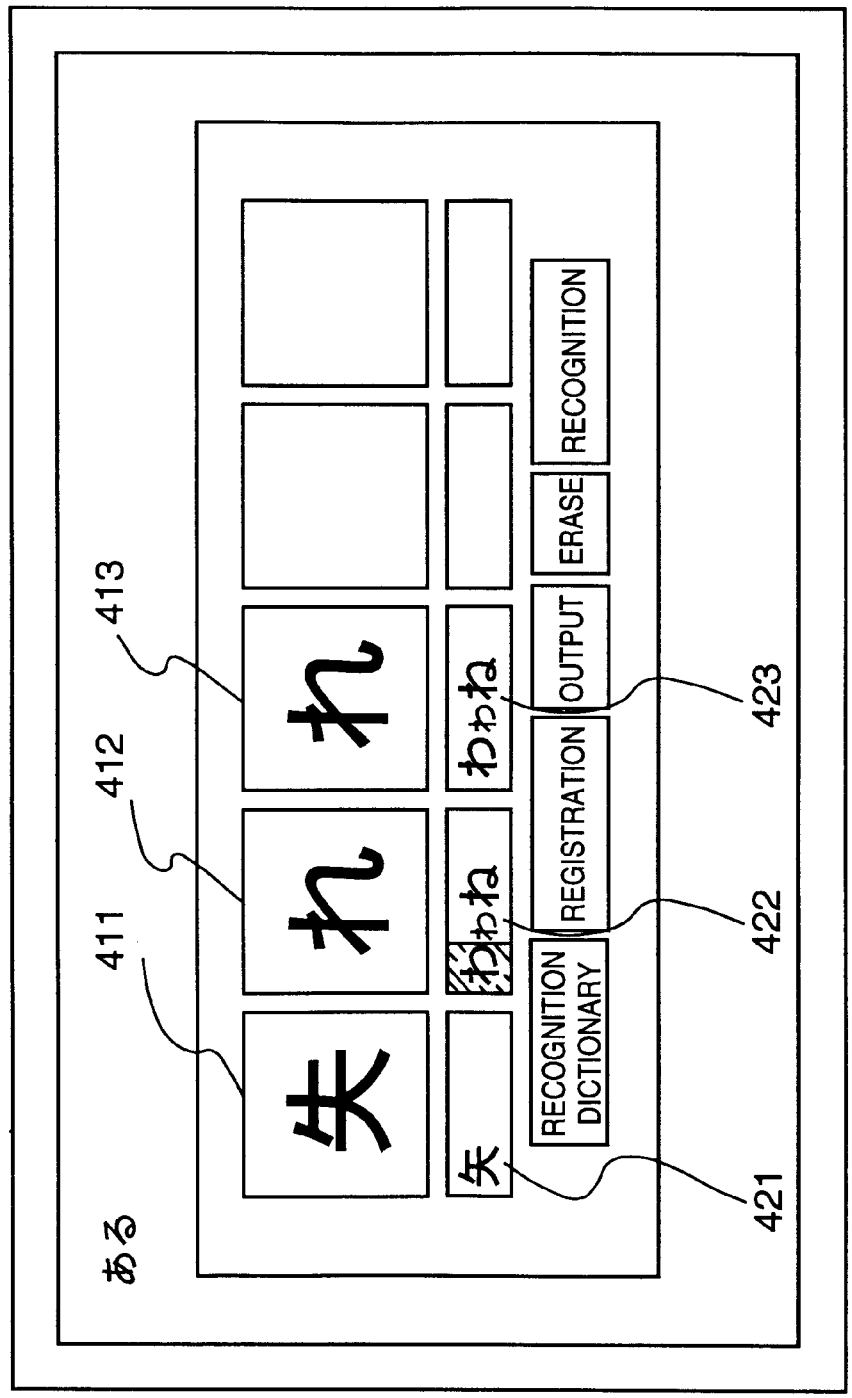
FIG. 8 is a diagram illustrating results of recognizing handwritten characters entered in FIG. 7 according to the first embodiment of the present invention.
Figure 9:
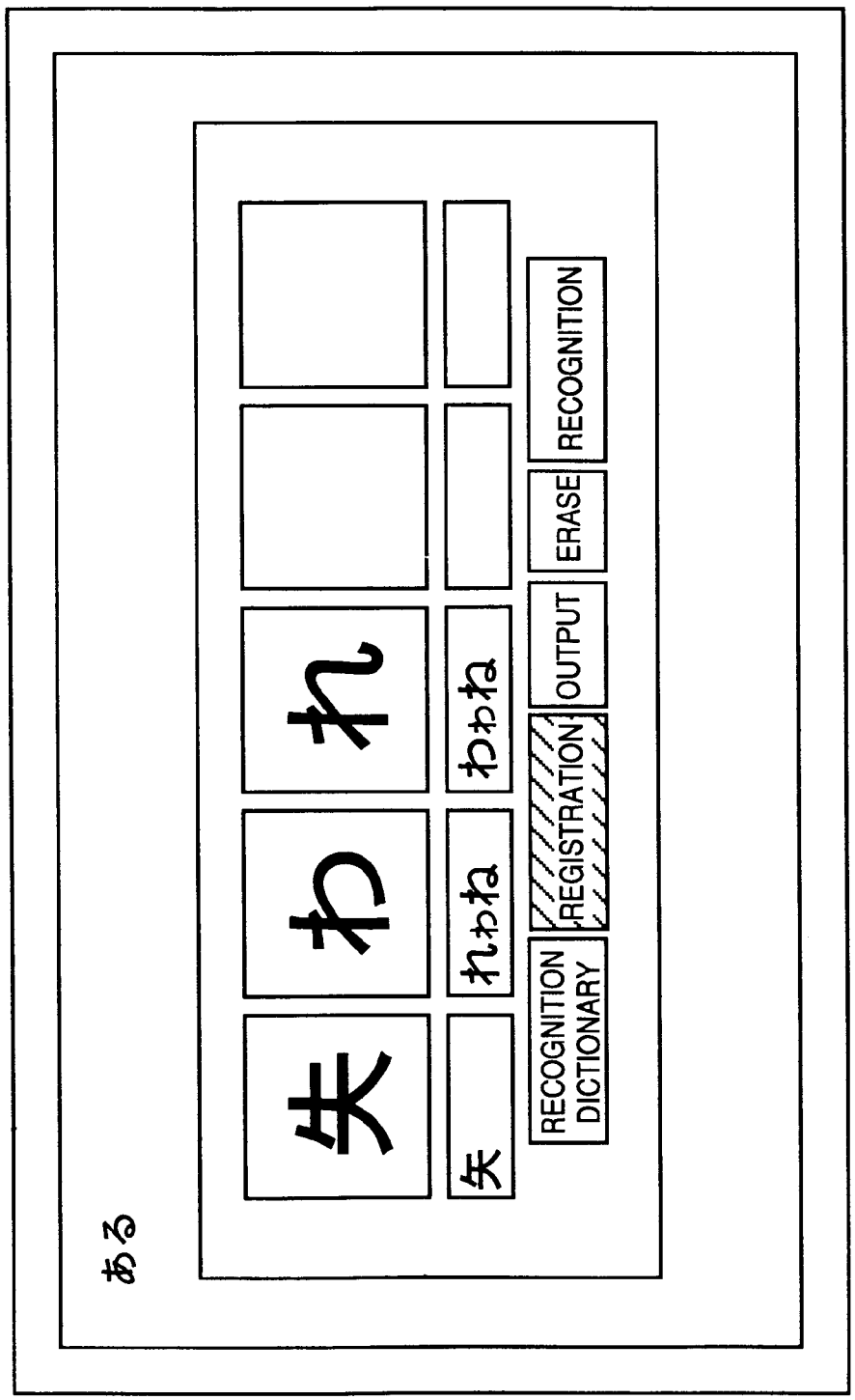
FIG. 9 is a diagram illustrating the results of completing a correction operation executed with regard to results of recognition obtained in FIG. 8 according to the first embodiment of the present invention.

FIG. 7 is a diagram illustrating the manner in which handwritten characters are entered on the character input panel 102a according to the first embodiment of the present invention, FIG. 8 is a diagram illustrating results of recognizing handwritten characters entered in FIG. 7 according to the first embodiment of the present invention, and FIG. 9 is a diagram illustrating the results of completing a correction operation executed with regard to results of recognition obtained in FIG. 8 according to the first embodiment of the present invention.

As shown in FIG. 7, a display screen 400 displays text created by an application, such as a word processor, for text editing. In the state shown in FIG. 7, the display screen 400 displays a character string reading "ある". Further, in the state shown in FIG. 7, the character input panel 102a, which resides within the display screen 400, displays a handwritten character string reading "失われ" that has been entered by the user employing the pen 11. The character input panel 102a is displayed on the screen of the application, such as the word processor, as a pop-up window for entry of handwritten characters. Input character frames 411~415 are defined on the input character panel 102a. Coordinate position data of the handwritten character that has been entered in each input character frame are detected and the detected position coordinate data are stored as one character of data. In FIG. 7, the handwritten character "失" has been entered in the input character frame 411, "わ" has been entered in the input character frame 412 and "れ" has been entered in the input character frame 413.

Candidate display areas 421~425 display recognition candidates from the second candidate onward among the recognition candidates of the handwritten characters that have been entered respective ones of the input character frames. Designation areas 431~435 allow the user to apply desired processing to the characters that have been entered. Designating any designation area using the pen 11 causes execution of the processing indicated in the designated area. This will now be described in greater detail.

The area 431 is for designating editing of the recognition dictionary. When this area is designated by the pen 11, processing for editing the recognition dictionary is executed. The details of this processing will be described later. The area 432 is for designating recording. When this area is designated by the pen 11, processing for registering data in the similar character table 5 begins. The registration processing will be described later with reference to the flowchart of FIG. 10. The area 433 is for designating output. When this area is designated by the pen 11, the character code corresponding to the result of recognizing a handwritten character entered in an input character frame is outputted to the display screen 400. The area 434 is for designating erasure. When this area is designated by the pen 11, the result of recognition displayed in an input character frame is erased. The area 435 is for designating start of recognition. When this area is designated by the pen 11, processing for recognizing a handwritten character there has been entered in an input character frame is started and the recognition candidate is outputted.

When recognition processing of a handwritten character that has been entered in an input character frame is executed in the first embodiment, the entered handwritten character in the input character frame vanishes and the first recognition candidate appears in this input character frame. Recognition candidates from the second onward appear in the underlying candidate display area.

When recognition processing is executed with regard to the handwritten characters "失われ" entered on the character input panel 102a shown in FIG. 7, recognition results of the kind shown in FIG. 8 are obtained.

As shown in FIG. 8, the handwritten character in the input character frame 411 vanishes and the character font "失" is displayed in its place as the first candidate of the results of recognition. In addition, "矢", which is the second candidate of the results of recognition, is displayed in the candidate display area 421. The handwritten character in the input character frame 412 vanishes and the character font "れ" is displayed in its place as the first candidate of the results of recognition. In addition, "わぬね" which is a group of recognition candidates from the second candidate onward, is displayed in the candidate display area 421. The handwritten character in the input character frame 413 vanishes and the character font "れ" is displayed in its place as the first candidate of the results of recognition. In addition, "わぬね", which is a group of recognition candidates from the second candidate onward, is displayed in the candidate display area 423.

With regard to the results of recognition shown in FIG. 8, the result "れ" in the input character frame 412 should have been recognized as the character "わ". Accordingly, the user executes processing to change the character "れ" displayed in the input character frame 412 to the character "わ". To make the change, the user designates "わ" in the candidate display area 422 by the pen 11, whereupon the character "れ" being displayed in the input character frame 412 changes to "わ" (see FIG. 9). The details of this processing will be described later with reference to the flowchart of FIG. 10.

It should be noted that when any area constituting the character input panel 102a is designated by the pen 11, this area is displayed in gray, for example, to distinguish it from the other areas.

Processing for registering similar characters executed in accordance with the first embodiment will now be described with reference to the flowchart of FIG. 10.

Figure 10:
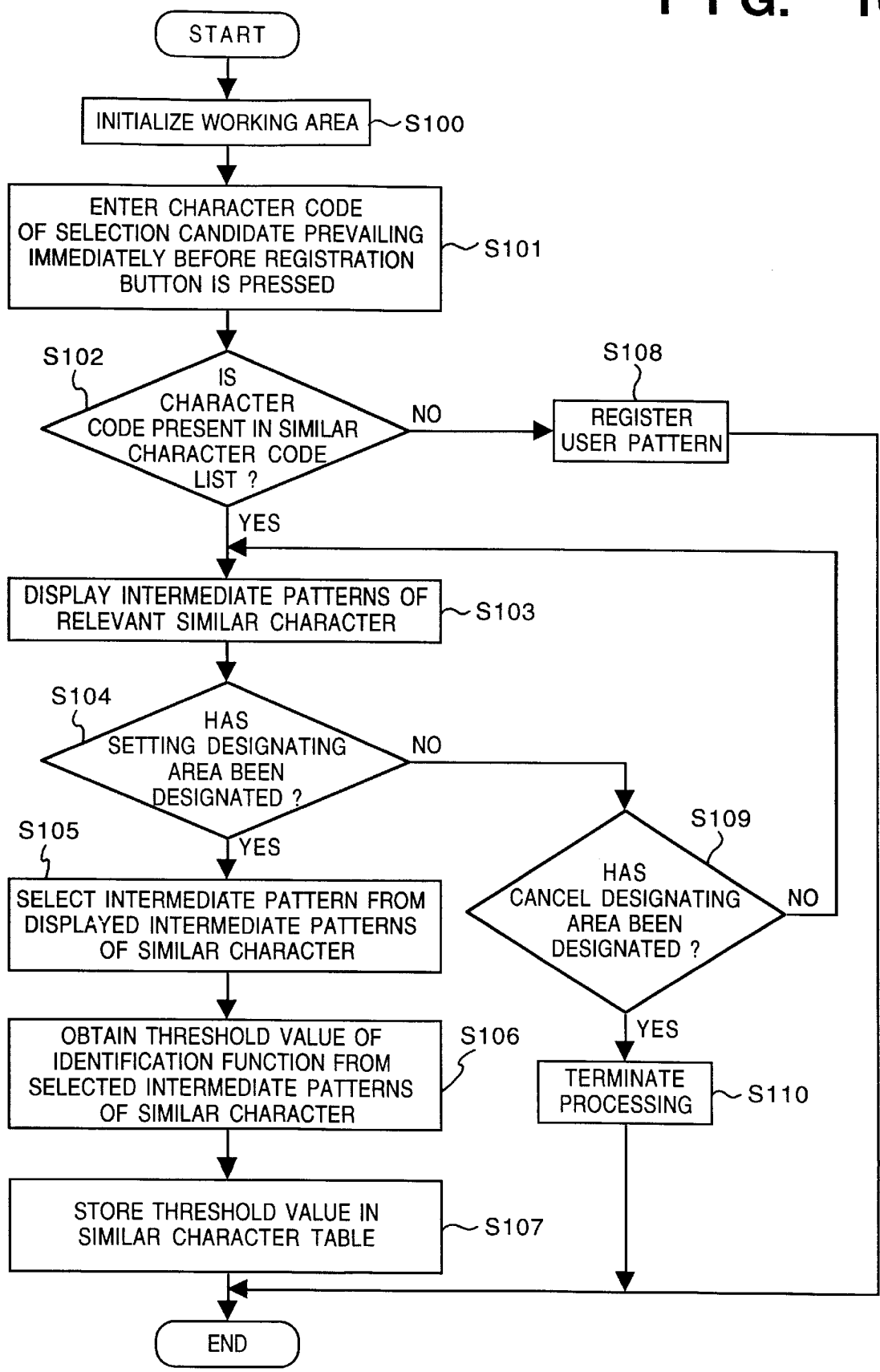
FIG. 10 is a flowchart illustrating the flow of processing for registering similar characters according to the first embodiment of the present invention.

The processing described using the flowchart of FIG. 10 is executed to improve the recognition rate in a case where an entered handwritten character has a low probability of being recognized as the character desired by the user, as shown in FIG. 8. In other words, in the case of FIG. 8, since the similar character identification function threshold values of "わ" and "れ" are not suited to "わ" and "れ" of the handwritten characters entered by the user, character misrecognition occurs. Accordingly, by re-establishing a similar character identification function threshold value suited to the features of the handwritten character entered by the user, the recognition rate of the desired character is improved.

The details will now be described.

The working storage area used in similar character registration processing is initialized at step S100. When the registration recording area 432 of the character input panel 102a is designated by the pen 11, the character code of the recognition candidate that has been selected is entered into the working storage area at step S101. If, in the example of FIG. 8, the registration recording area 432 is designated when "わ" displayed in the candidate display area 422 has been selected, then the character code for "わ" is entered into the working storage area.

Next, it is determined at step S102 whether the character code that has been entered in the working storage area is present in the similar character code list of the similar character table 5. If the character code is not present in the similar character code list of the similar character table 5 ("NO" at step S102), the program proceeds to step S108. Here a transition is made to processing for registering a user pattern. This processing includes extracting the features of the strokes of the handwritten character entered by the user and recognizing the handwritten character. Further, the character code corresponding to the character recognized to have these features is stored on a storage medium to create a recognition dictionary for recognizing handwritten characters entered by the user. This processing is outside the scope of this invention and the details thereof are not described here.

In a case where the character code is present in the similar character code list of the similar character table 5 ("YES" at step S102), the classification number of this similar character is stored in the working storage area and the program proceeds to step S103. In the example of FIG. 8, stroke coordinate data of intermediate patterns 1~6 of similar character classification number 1 are read out as the intermediate patterns of the similar character of similar character classification number 1, and a display of the kind shown in FIG. 11 is displayed on the character input panel 102a.

The details of the screen displayed at step S103 will be described with reference to FIG. 11.

Figure 11:
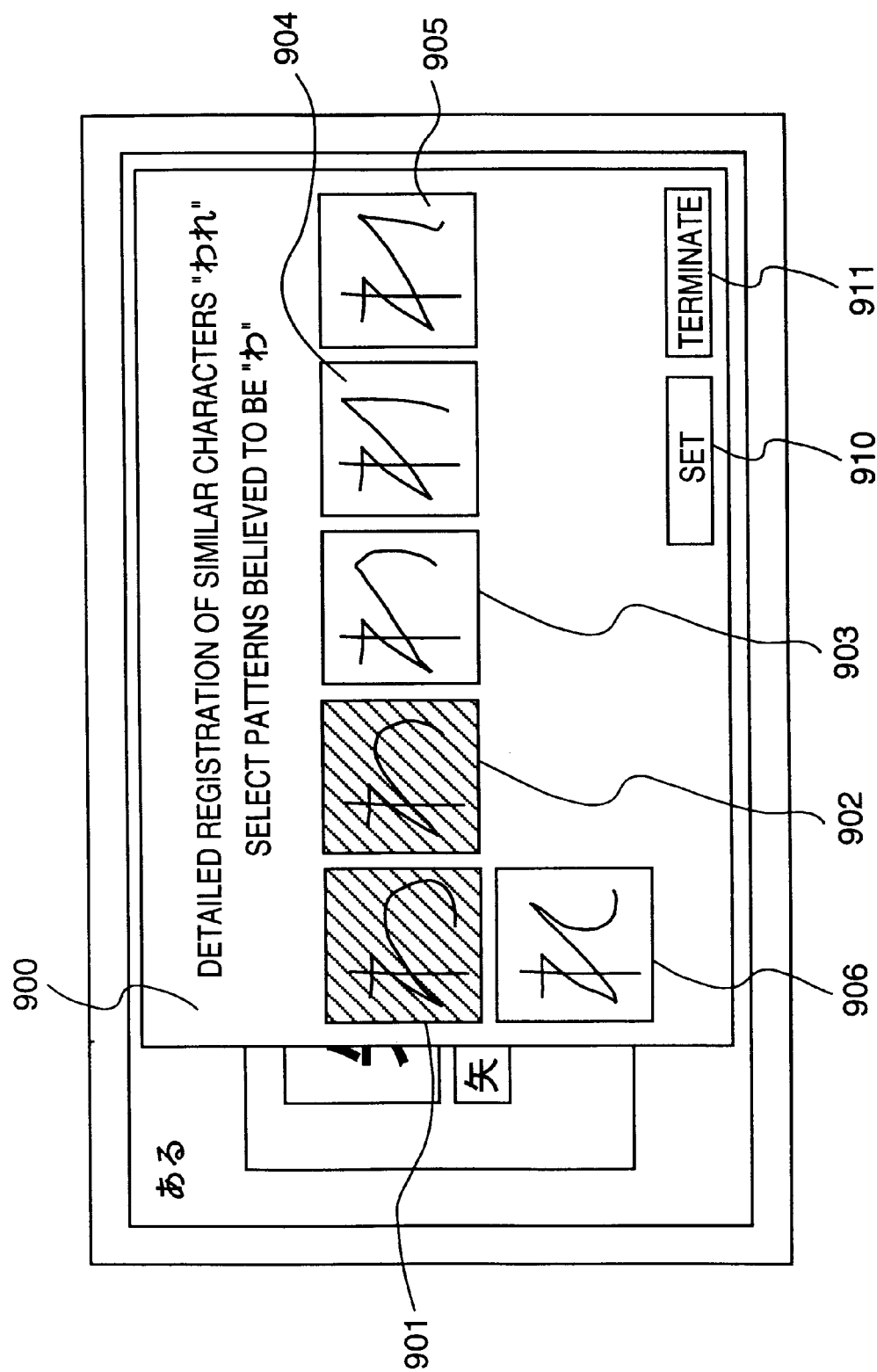
FIG. 11 is a diagram illustrating a control screen for registering intermediate patterns of similar characters according to the first embodiment of the present invention.

FIG. 11 is a diagram illustrating a control screen for registering intermediate patterns of similar characters according to the first embodiment of the resent invention.

In FIG. 11, a main window 900 is for registering intermediate patterns of similar characters. When the registration designating area 432 on the character input panel 102a is designated by the pen 11, this window is displayed on the character input panel 102a. Areas 901~906 are for selecting intermediate pattern displays of the similar characters. These areas display the strokes of the intermediate patterns of the similar characters contained in the similar character table 5. By designating any intermediate pattern display selection area using the pen 11, the user can select the desired intermediate pattern. In FIG. 11, the intermediate patterns of the similar characters "わ" and "れ" are displayed.

An area 910 is for designating setting. When this area is designated by the pen 11, an identification function is used as the selected intermediate pattern and the similar character identification function threshold value is calculated. The calculated similar character identification function threshold value is set in the "Similar Character Identification Function Threshold Value" field of similar character table 5 as a new threshold value. After the threshold value is set, the main window 900 closes.

An area 911 is for designating canceling. When this area is designated by the pen 11, the processing for registering the intermediate pattern of the selected similar character is canceled. The main window 900 closes after the area 911 is designated.

It should be noted that when any of the intermediate pattern display selection areas 901~906 has been selected, the selected area is displayed in gray. When an intermediate pattern display selection area is selected anew by being designated by the pen 11, the selected area is displayed in gray. In the illustrated example, it will be understood that the intermediate pattern display selection areas 901 and 902 have been selected.

With reference again to the flowchart of FIG. 10, it is determined at step S104 whether the setting designating area 910 has been designated. If this area has not been designated ("NO" at step S104), the program proceeds to step S109. If the area 910 has been designated, ("YES" at step S104), then the program proceeds to a step S105.

It is determined at step S109 whether the cancel designating area 911 has been designated. If this area has not been designated ("NO" at step S109), the program returns to step S103. If the area 911 has been designated, ("YES" at step S109), then the program proceeds to step S110. Here the processing for registering the intermediate pattern of similar characters is terminated at the main window 900 closes.

Figure 12:
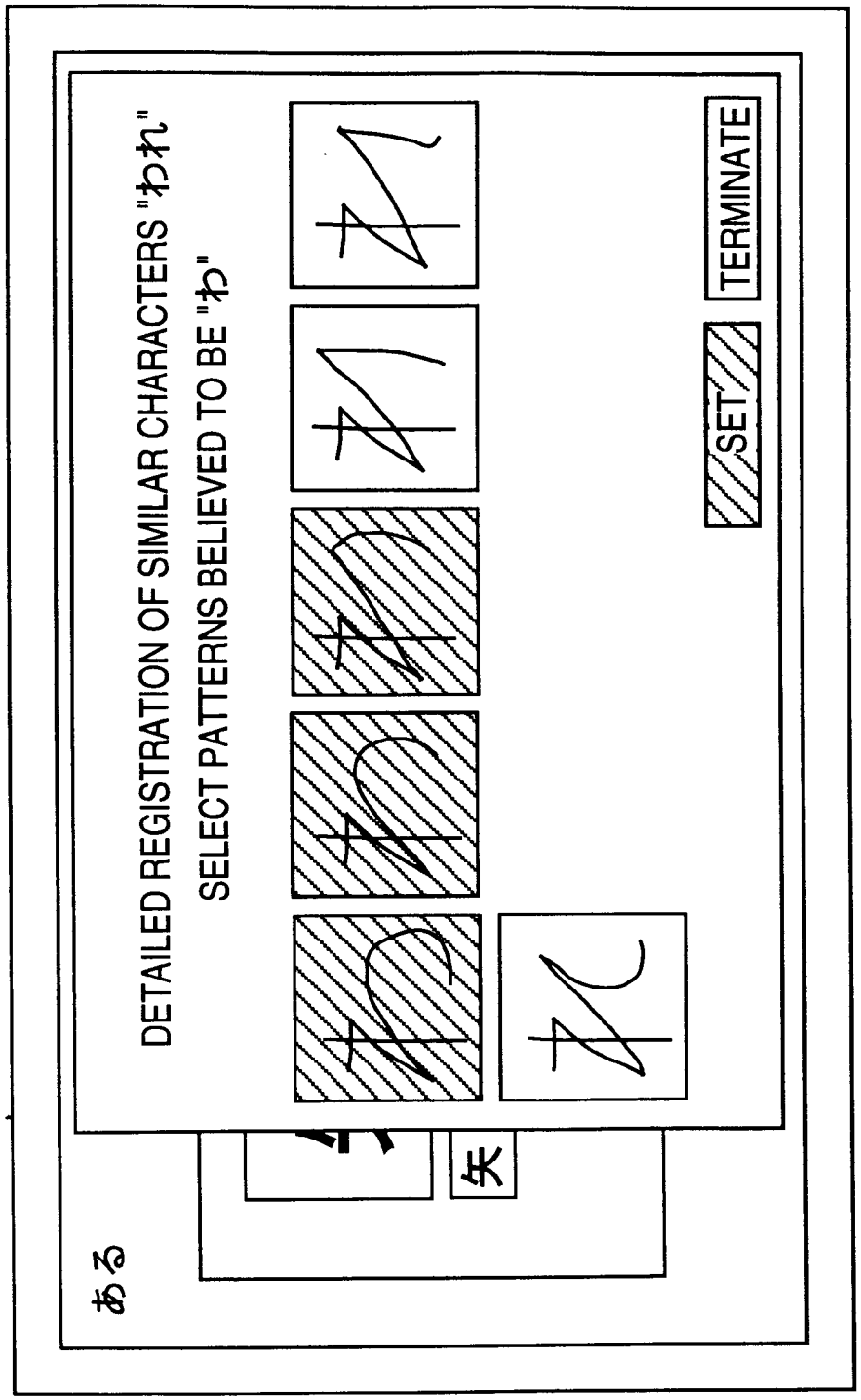
FIG. 12 is a diagram showing an example of operation of a control screen for registering intermediate patterns of similar characters according to the first embodiment of the present invention.

Processing for selecting an intermediate pattern is executed at step S105. In the example of FIG. 11, the intermediate pattern display selection areas 901 and 902 have been selected. However, if another intermediate pattern display selection area is designated anew by the pen 11, then the selected intermediate pattern display selection area is displayed in gray in accordance with the area designated. For example, if the intermediate pattern display selection area 903 has been designated by the pen 11, then the intermediate pattern of the intermediate pattern display selection area 903 will also be selected along with the intermediate patterns of the intermediate pattern display selection areas 901 and 902. The intermediate pattern display selection areas 901~903 will be displayed in gray, as shown in FIG. 12. Furthermore, if the intermediate pattern display selection area 902 has been selected by the pen 11, then the intermediate pattern display selection area 901 and the intermediate pattern display selection area 902 are displayed in gray. Thus, when a desired intermediate pattern display selection area is designated, processing is executed in such a manner that the intermediate pattern display selection areas from the designated intermediate pattern display selection area to the intermediate pattern display selection area 901 will be selected.

The coordinate position data of a stroke in the intermediate pattern of a selected similar character enter the working storage area. For example, when the intermediate pattern of the intermediate pattern display selection area 903 is newly selected from the state of selection of the intermediate patterns of the similar character in the main window 900 of FIG. 11, the position coordinate data of the stroke corresponding to the intermediate pattern (the intermediate pattern 3 of the similar character) of the intermediate pattern display selection area 903 enter the working storage area.

Calculation based upon the identification function regarding the position coordinate data of the stroke of the intermediate pattern of the selected similar character is performed at step S106 to obtain the similar character identification function threshold value. Specifically, with regard to the example of FIG. 12, the identification function of "わ" and "れ" is such that the distance of the second stroke of the entered stroke pattern is divided into 11 segments and the angle of the direction of the direction vector obtained by connecting the coordinates of the ninth segment and the coordinates of the end point is calculated, as described earlier with reference to FIG. 6. Since the intermediate pattern 3 of the similar characters "わ" and "れ" is entered, 181° is calculated as the angle of this direction.

The similar character identification function threshold value calculated is set in the similar character table 5 at step S107. In the example of FIG. 12, 181° is calculated anew as the similar character identification function threshold value of "わ" and "れ". Therefore, the threshold value 181° is stored in the "Similar Character Identification Function Threshold Value" field of the similar character classification number 1 in the similar character table 5. In other words, with regard to handwritten characters entered from this setting onward, if the handwritten characters are identified as being the similar characters "わ" and "れ" and a similar character identification function threshold value obtained using the identification function for the strokes of these handwritten characters is 181° or greater, "わ" is recognized.

An overview of processing executed according to the first embodiment will now be described with reference to the flowchart of FIG. 13.

Figure 13:
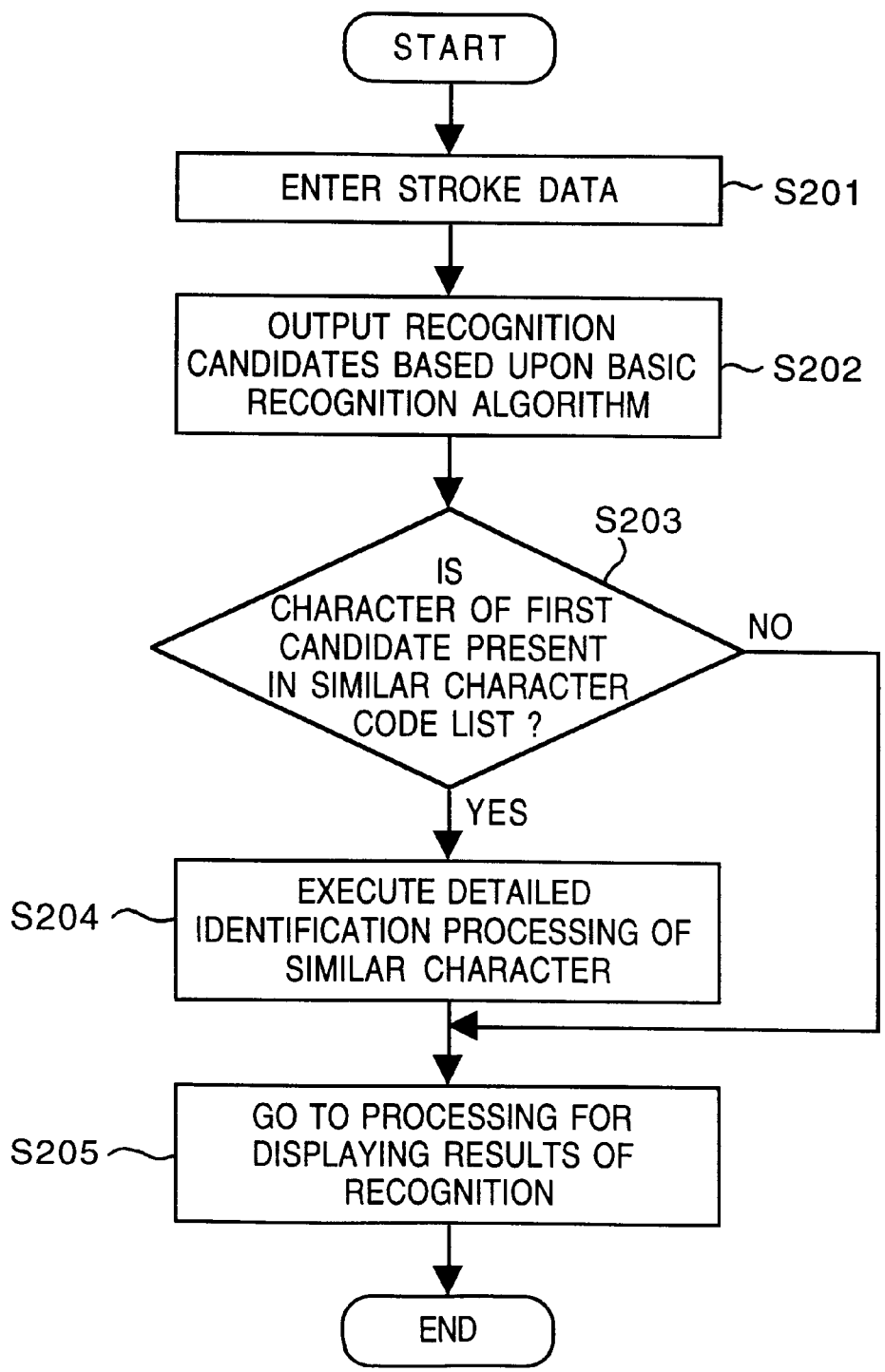
FIG. 13 is a flowchart illustrating an overview of the flow of processing executed according to the first embodiment of the present invention.

FIG. 13 is a flowchart illustrating an overview of the flow of processing executed according to the first embodiment of the present invention.

Processing for entering stroke data of a handwritten character into the character input panel 102a using the pen 11 is executed at step S201. Processing for outputting recognition candidates based upon a basic character recognition algorithm is executed at step S202. For example, use is made of the feature-point character recognition algorithm described in Japanese Patent Publication No. 62-39460.

It is determined at step S203 whether the character code of the first recognition candidate is present in the similar character code list stored in the similar character table 5. If the character code is not in the similar character code list ("NO" at step S203), the program proceeds to step S205. If the character code is present in the similar character code list ("YES" at step S203), then the program proceeds to step S204.

The similar character is subjected to detailed identification processing at step S204. This processing has already been described in detail with reference to the flowchart of FIG. 10. The character code of the recognition candidate, which sent to the recognitionresult display unit 4, is presented on the character input panel 201a.

Processing for registering intermediate patterns of similar characters during an operation for entering handwritten characters has been described in the first embodiment. However, if there are cases where, depending upon the user, it is desired to change the similar character identification function threshold value before a handwritten character is entered, then there will be a request for viewing a list of similar characters. This is implemented by using the pen 11 to designate the area 431, which is for designating editing of the recognition dictionary, on the character input panel 102a.

Figure 14:
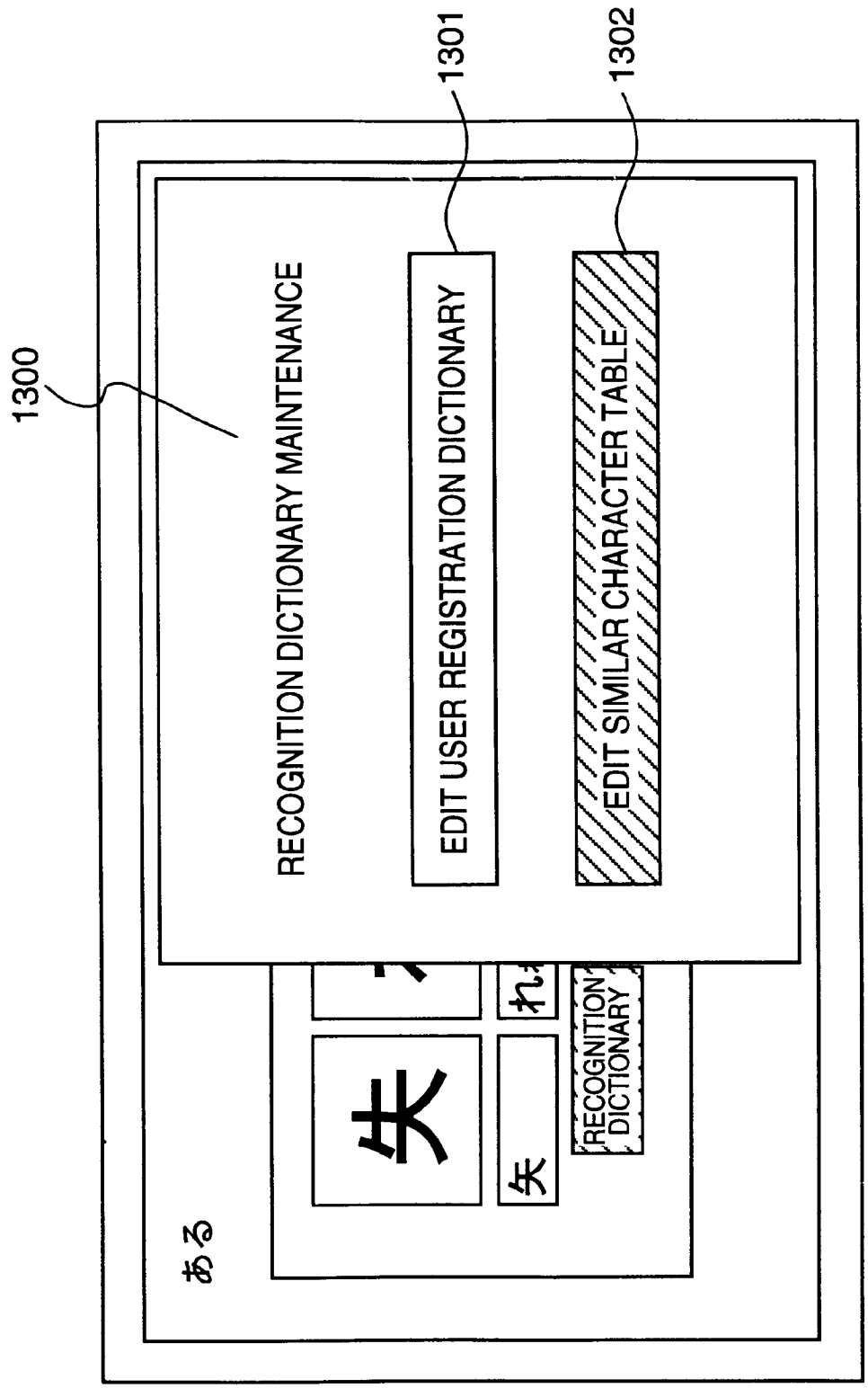
FIG. 14 is a diagram showing a display screen of a recognition dictionary maintenance window according to the first embodiment of the present invention.

When the area 431 is designated by the pen 11, a recognition dictionary maintenance window 1300 of the kind shown in FIG. 14 is displayed.

FIG. 14 is a diagram showing the display screen of the recognition dictionary maintenance window 1300 according to the first embodiment of the present invention.

Figure 15:
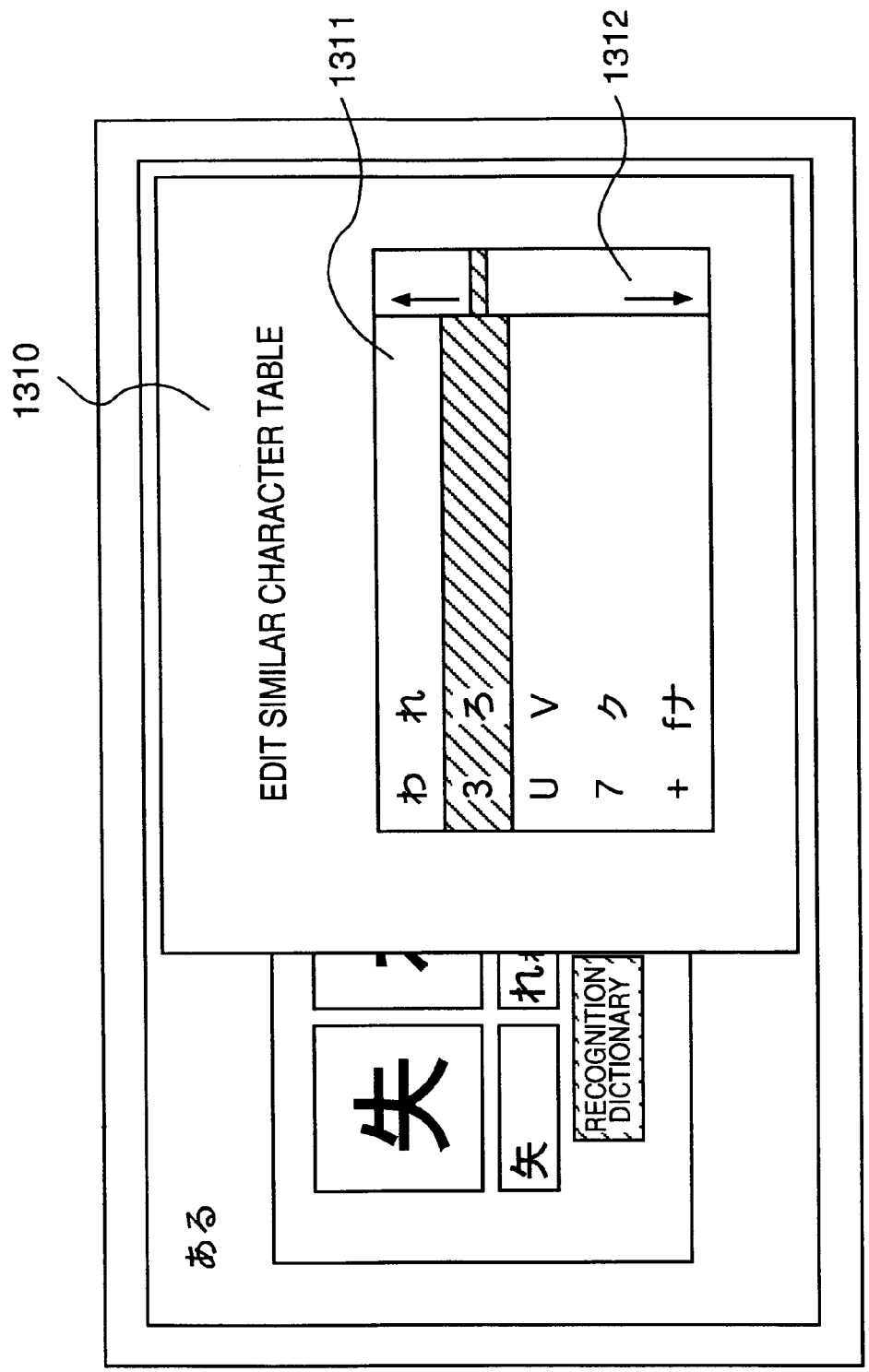
FIG. 15 is a diagram of a display screen showing a list display of a similar character table according to the first embodiment of the present invention.

The recognition dictionary maintenance window 1300 is composed of an area 1301 for designating editing of a user registration dictionary and an area 1302 for designating editing of the similar character table. When the area 1301 is designated by the pen 11, the processing described in connection with step S108 of FIG. 10 is executed. When the area 1302 is designated, processing for editing the similar character table starts and a list display 1310 of the similar character table of the kind shown in FIG. 15 is displayed. By selecting desired similar characters from the similar characters displayed, the selected similar characters can be subjected to processing for registering intermediate patterns of the similar characters. This processing was described above in connection with the flowchart of FIG. 10.

The area designated by the pen 11 is displayed in gray to notify the user of the fact that is has been designated.

FIG. 15 is a diagram of a display screen showing the list display of the similar character table according to the first embodiment.

An area 1311 displayed in the list display 1310 of the similar character table is for displaying a code list of similar characters. More specifically, the area 1311 displays a list of character codes of similar characters that have been stored in the similar character table 5. An area 1312 is a scroll designation area. Designating the area 1312 scrolls the similar characters displayed in the similar character code list display area 1311. Scrolling continues for as long as the area 1312 is designated. As a result, a list of character codes of all similar characters is displayed. After the user causes desired similar characters that the user wishes to select to be displayed in the similar character code list display area 1311 by designating the area 1311 using the pen 11, the user designates the desired similar characters. The selected similar characters are displayed in gray to notify the use of the fact that these characters have been designated. In FIG. 15, for example, the similar characters "3" and "ろ" have been selected.

In accordance with the first embodiment, as described above, it is possible to set a similar character identification function threshold value in which a similar character identification function threshold value for identifying similar characters on the character input panel 102a is made to conform to the features of similar characters entered by the user. Therefore, since a similar character entered by the user has features, a similar character identification function threshold value made to conform to the features is set anew, even if the similar character cannot be identified accurately. This makes it possible to identify the similar character using the similar character identification function threshold value that has been reset. The result is an improvement in the recognition rate of similar characters.

<Second Embodiment>

In the first embodiment, a group of intermediate patterns of similar characters is stored in the similar character table 5 beforehand, a desired intermediate pattern is selected from the group and a similar character identification function threshold value is calculated. In the second embodiment to be described below, intermediate patterns of similar characters are generated by combining the strokes that construct each of the similar characters. In comparison with the first embodiment, therefore, storing a group of intermediate patterns in advance is unnecessary. This makes it possible to reduce the storage capacity of the similar character table 5.

Figure 16:
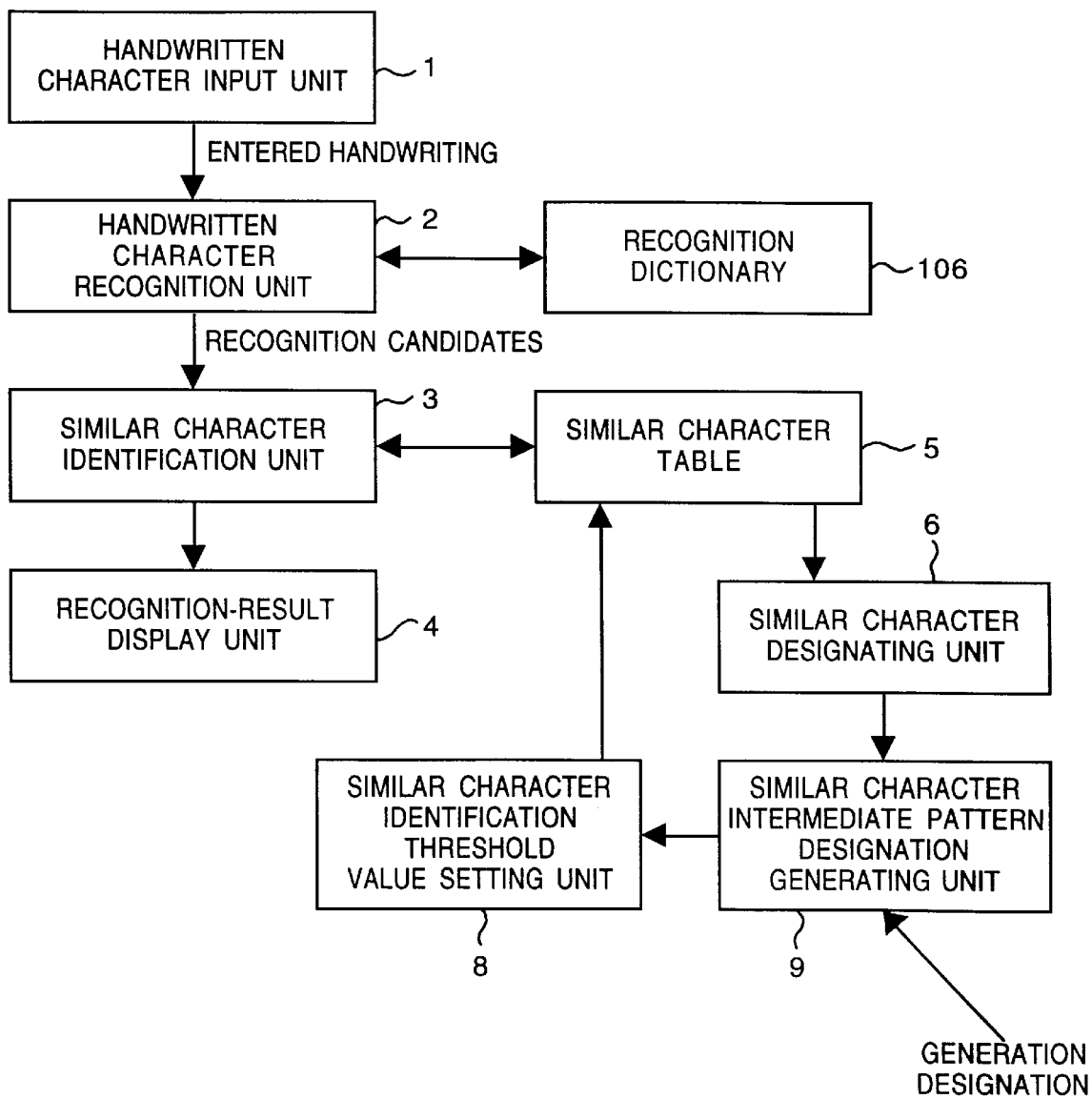
FIG. 16 is a block diagram illustrating the functional construction of the handwritten character recognition apparatus according to a second embodiment of the present invention.

The architecture of the handwritten character recognition apparatus according to the second embodiment is similar to that of the first embodiment and the details thereof need not be described again. The functional elements of the handwritten character recognition apparatus according to the second embodiment includes elements substantially the same as those of the first embodiment. These similar elements are designated by like reference characters and a description thereof is deleted. In FIG. 16, numeral 9 denotes a similar character intermediate pattern designation generating unit. The unit 9 combines strokes, which construct similar characters, and generates intermediate patterns of these similar characters.

FIG. 16 is a block diagram illustrating the functional construction of the handwritten character recognition apparatus according to the second embodiment of the present invention.

The similar character intermediate pattern designation generating unit 9 generates and displays synthesized patterns of similar characters designated by the similar character designating unit 6 and generates desired intermediate patterns in accordance with a designation made by the user.

A method of generating synthesized patterns of similar characters by the similar character intermediate pattern designation generating unit 9 will be described with reference to FIGS. 17~19.

Figure 17A:
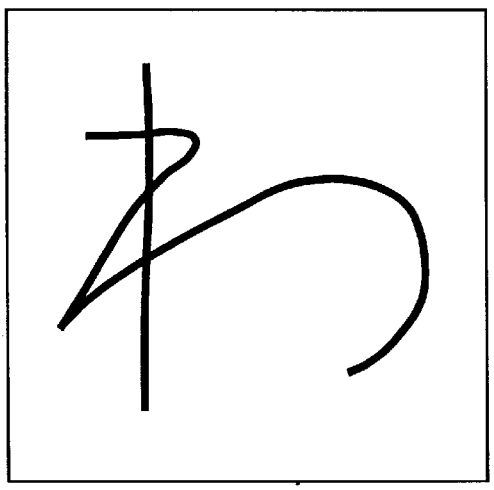
FIG. 17A illustrates the standard stroke pattern of the hiragana character "わ" of similar hiragana characters "わ" and "れ"
Figure 17B:
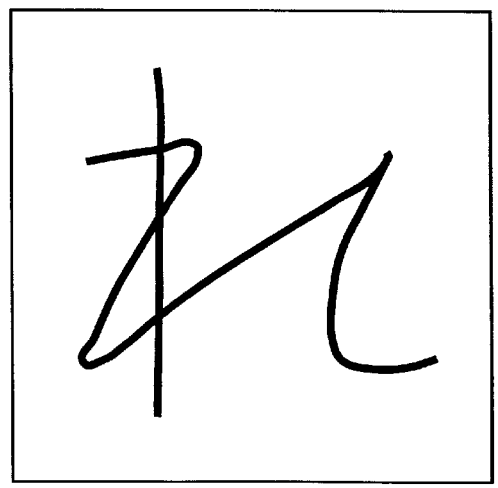
FIG. 17B illustrates the standard stroke pattern of the hiragana character of similar hiragana characters "わ" and "れ"
Figure 18:
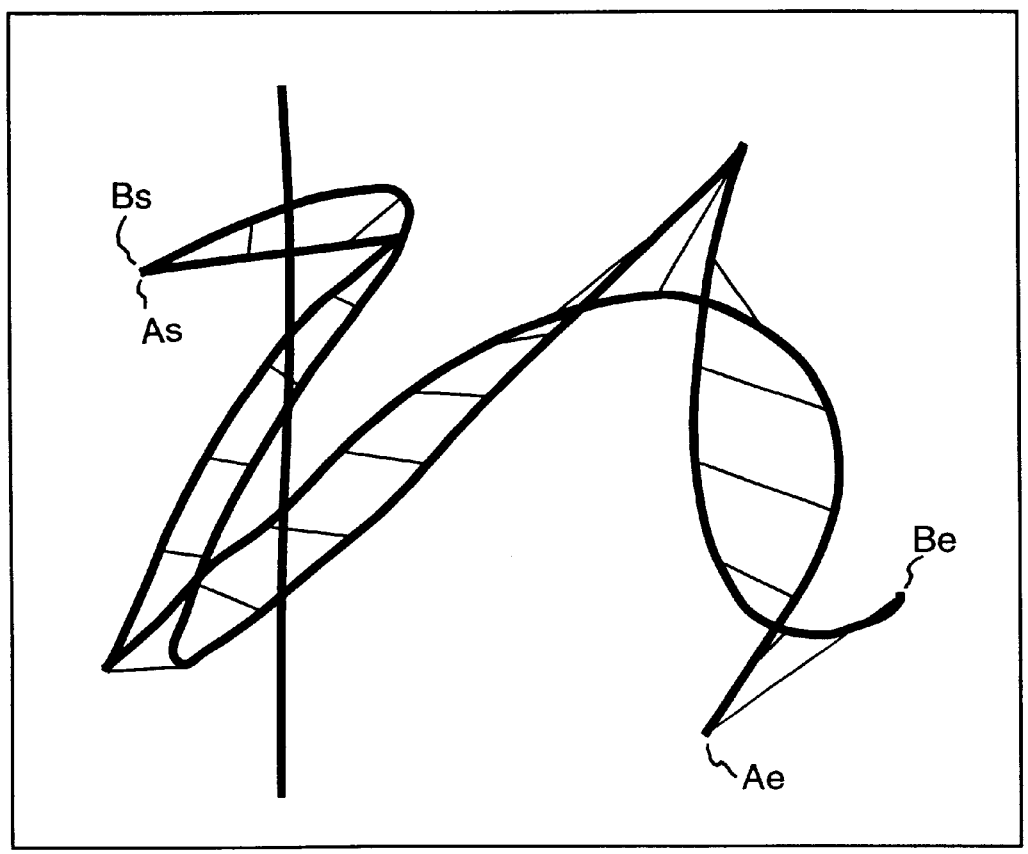
FIG. 18 is a diagram showing a synthesized pattern obtained by combining the stroke patterns of the characters "わ" and "れ" shown in FIG. 17 according to the second embodiment of the present invention.
Figure 19:
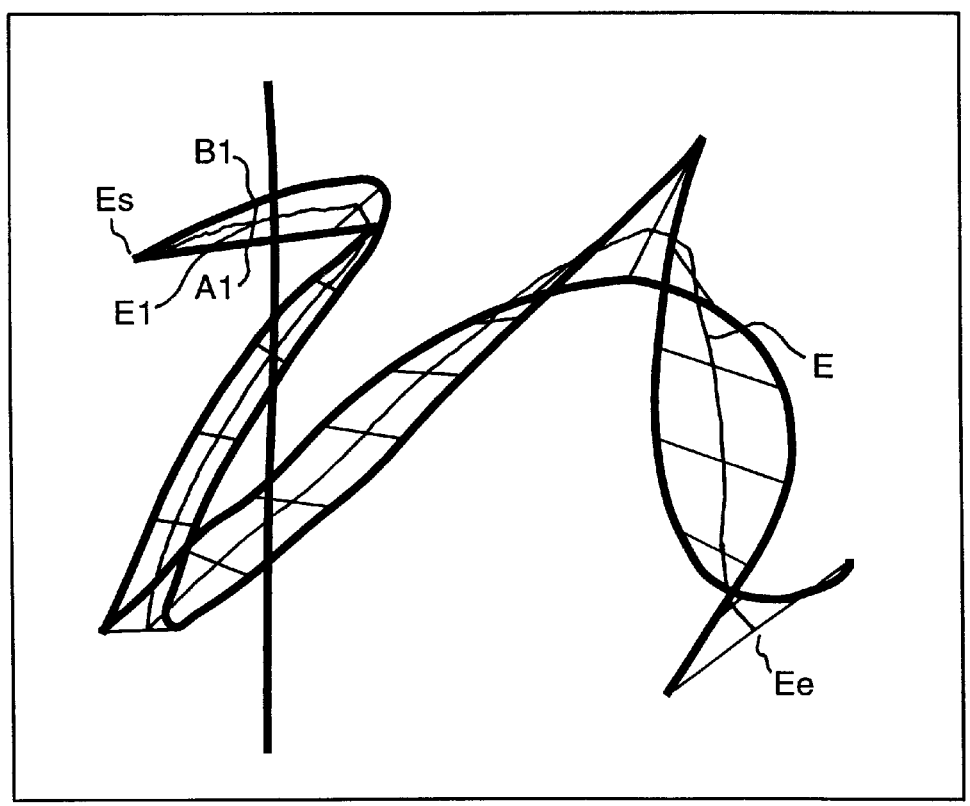
FIG. 19 is a diagram showing a desired intermediate pattern produced using the synthesized pattern depicted in FIG. 18 according to the second embodiment of the present invention.

FIGS. 17~19 are diagrams for describing a method of generating synthesized patterns between similar characters according to the second embodiment of the invention.

FIG. 17A illustrates the standard stroke pattern of the hiragana character "わ" of similar hiragana characters "わ" and "れ", and FIG. 17B illustrates the standard stroke pattern of the hiragana character "れ" of similar hiragana characters "わ" and "れ". FIG. 18 is a diagram showing a synthesized pattern obtained by combining the stroke patterns of the characters "わ" and "れ", which are shown in FIG. 17, displayed in the character frames of the character input panel 102a. Here the second stroke of "わ" and the second stroke of "れ" are combined. As shown in FIG. 18, the segment from the starting point to the end point of the stroke distance of the second stroke of "わ" is divided up into 20 equal segments and the segment from the starting point to the end point of the stroke distance of the second stroke of "れ" is divided up into 20 equal segments. Furthermore, counterpart coordinate values are correlated and stored in the RAM 101. That is, the starting point of the second stroke of "わ" and the starting point of the second stroke of "れ" are correlated and stored, the 1/20 point of the second stroke of "わ" and the 1/20 point of the second stroke of "れ" are correlated and stored, . . . , and the n/20 point of the second stroke of "わ" and the n/20 point of the second stroke of "れ" are correlated and stored, where n is an integer of 1 to 20. A desired intermediate stroke between the stroke of "わ" in FIG. 17A and the stroke of "れ" in FIG. 17B constructing the synthesized pattern is entered in the manner of stroke E in FIG. 19, by way of example.

The position coordinate data of the desired intermediate pattern, namely the intersection between a straight line connected the starting points As, Bs in FIG. 18 and the stroke E of FIG. 19, is the starting point Es of the desired intermediate pattern. This will be described taking the 1/20 point of the stroke of "わ" in FIG. 17A and of the stroke of "れ" in FIG. 17B as an example. If we let the coordinate position data A1 of the 1/20 point of the second stroke of "わ" be (54,25) and let the coordinate position data B1 of the 1/20 point of the second stroke of "れ" be (47,18), any coordinate position data on the straight line connecting these points may be selected as the position coordinate data of the 1/20 point of the stroke of the desired intermediate pattern. In FIG. 19, the coordinate position data E1 (48,20), at which the 1/20 point of stroke E intersects the straight line connecting the coordinate position data A1 (54,25) and coordinate position data B1 (47,18), is selected.

Similarly, the point at which the stroke E intersects the coordinate position data A2 of the 2/20 point of the stroke of "わ" in FIG. 17A and the coordinate position data B2 of the 2/20 point of the stroke of "れ" FIG. 17B becomes the coordinate position data E2 of the 2/20 point of the stroke of the desired intermediate pattern. Similarly, the point at which the stroke E intersects the coordinate position data Ae of the end point (20/20 point) of the stroke of "わ" in FIG. 17A and the coordinate position data Be of the end point (20/20 point) of the stroke of "れ" in FIG. 17B becomes the coordinate position data E2 of the end point (20/20 point) of the stroke of the desired intermediate pattern. The stroke of the desired intermediate pattern comprising each item of coordinate position data of Es~Ee is generated in this manner.

The pattern of the stroke of "わ" in FIG. 17A and the pattern of the stroke of "れ"0 in FIG. 17B are stored in the table of intermediate patterns of similar characters (FIG. 4) as an intermediate pattern 1 and an intermediate pattern 2 of similar characters, as shown in FIG. 20. When the similar character intermediate pattern designation generating unit 9 starts operating, the intermediate pattern 1 and intermediate pattern 2 of the similar characters corresponding to the standard pattern of "わ" and the standard pattern of "れ" are read out and the synthesized stroke obtained by combination is displayed in the character frame.

Processing according to the second embodiment for generating any intermediate pattern of a similar character will now be described with reference to the flowchart of FIG. 21.

Figure 21:
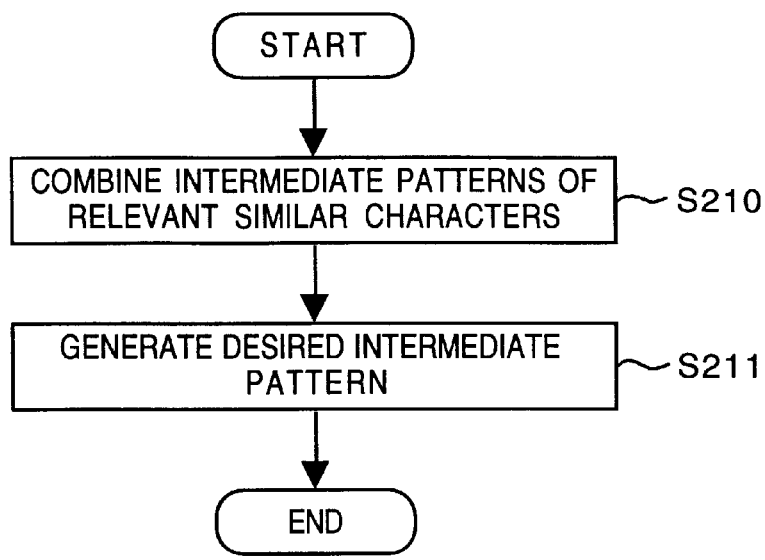
FIG. 21 is a flowchart illustrating the flow of processing for generating any intermediate pattern of a similar character according to the second embodiment of the present invention.

FIG. 21 is a flowchart illustrating the flow of processing for generating any intermediate pattern of a similar character according to the second embodiment of the present invention.

The processing according to the flowchart of FIG. 21 is substituted for step S103 of FIG. 10. As other steps are the same as those in the flowchart of FIG. 10, these steps need not be described again.

At step S210 in FIG. 21, the standard patterns between the entered similar characters are combined and the synthesized pattern resulting from the combination is displayed in the entered character frame. Next, at step S211, the user employs the pen 11 to enter the desired intermediate pattern in the synthesized pattern that has been displayed.

In accordance with the second embodiment, as described above, a desired intermediate pattern is generated by the pen 11 using a synthesized pattern obtained by combining standard patterns between similar characters of the similar character table 5. Consequently, effects similar to those of the first embodiment can be obtained merely by storing only standard patterns between similar characters as intermediate patterns of similar characters stored beforehand in the similar character table 5. Moreover, the storage capacity of the similar character table 5 can be reduced.

Further, in the first embodiment, the number of intermediate patterns is limited. In the second embodiment, however, the arrangement is such that a desired intermediate pattern can be entered by the user. The number of intermediate patterns, therefore, can be generated almost without limit. This means that it is possible to set a similar character identification function threshold value that conforms to the user's handwriting more closely, thereby raising the recognition rate.

The description given above relates to the similar characters "わ" and "れ" stored in the similar character table 5 as the similar character classification number 1. Processing with regard to similar characters "U" and "V" is similar to that of the first and second embodiments.

Figure 27:
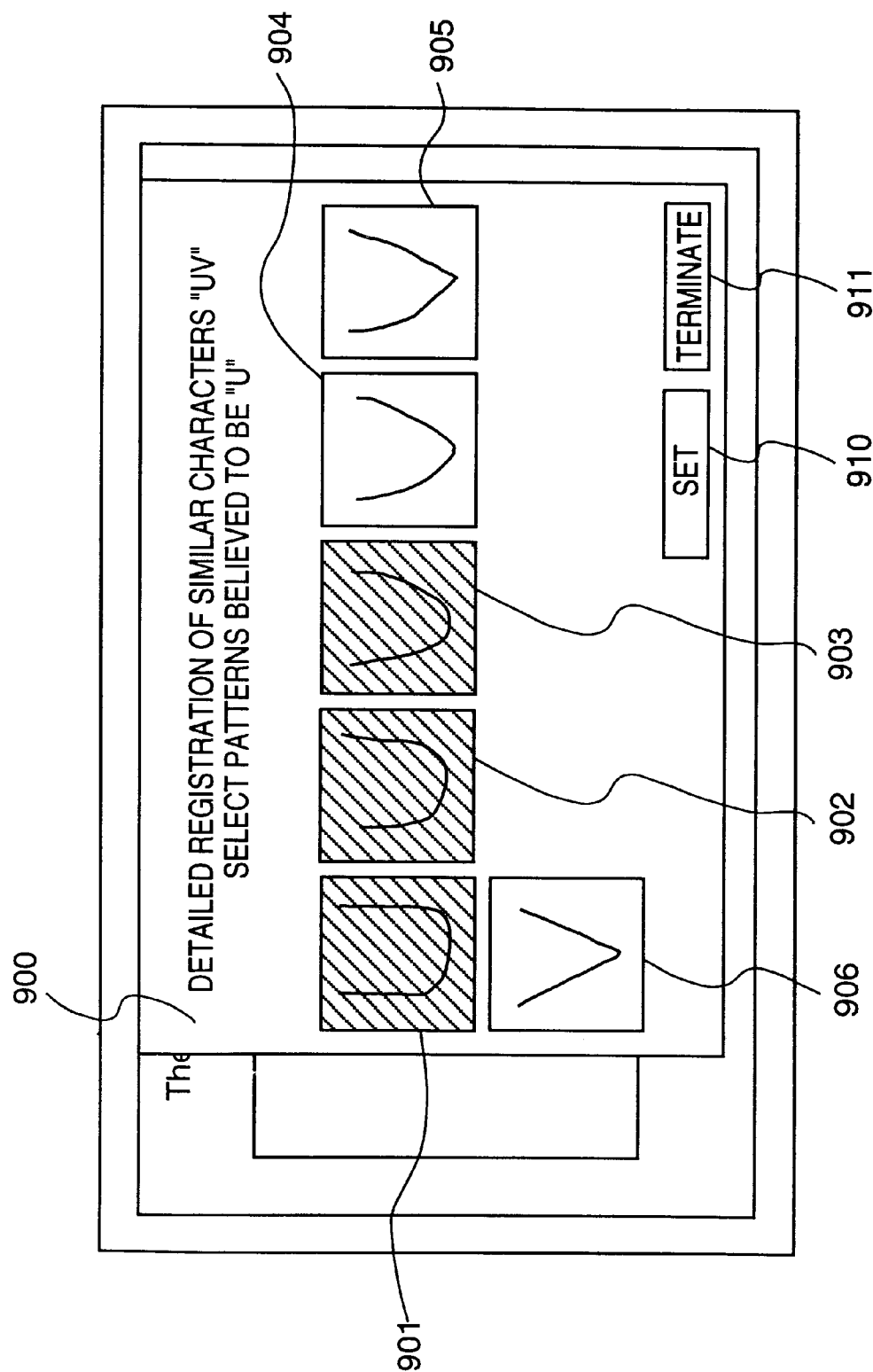
FIG. 27 is a diagram illustrating a control screen for registering intermediate patterns of similar characters according to the first embodiment of the present invention.

Intermediate patterns of the kind shown in FIG. 23 are stored in the fields from the "Similar Character Classification No. 3, Intermediate Pattern 1" field to the "Similar Character Classification No. 3, Intermediate Pattern 6" field in correspondence with the similar character classification number 3, and the user makes a designation on the detailed registration screen for "U" and "V" shown in FIG. 27. An identification function threshold value obtained from a pattern which best represents the dividing line between "U" and "V" as far as the user is concerned is stored as the "Threshold Value of Identification Function 1 of UV" in the similar character table.

Figure 24:
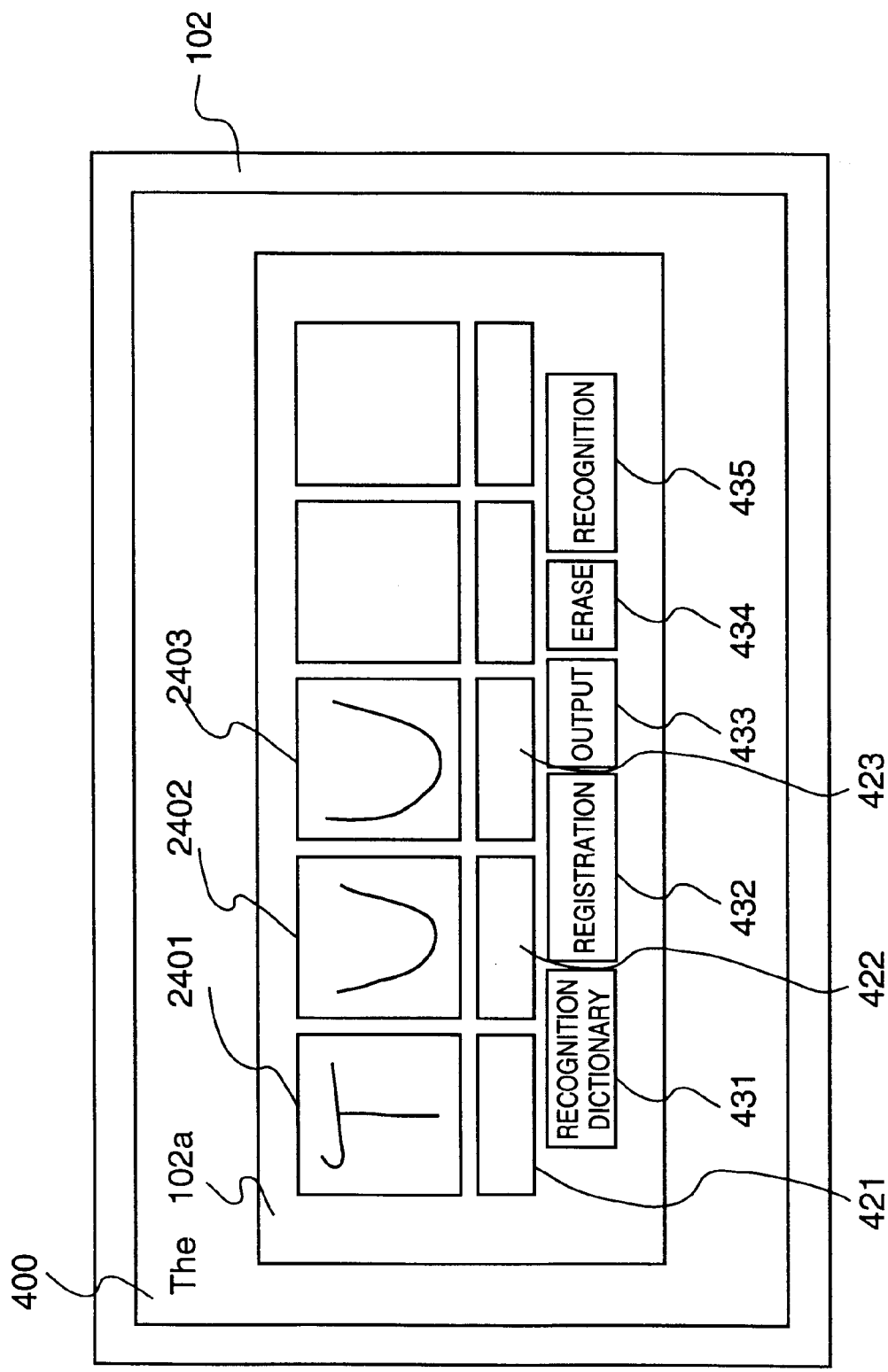
FIG. 24 is a diagram showing the manner in which "TUV" have been entered by handwritten characters on the character input panel according to the first embodiment.
Figure 25:
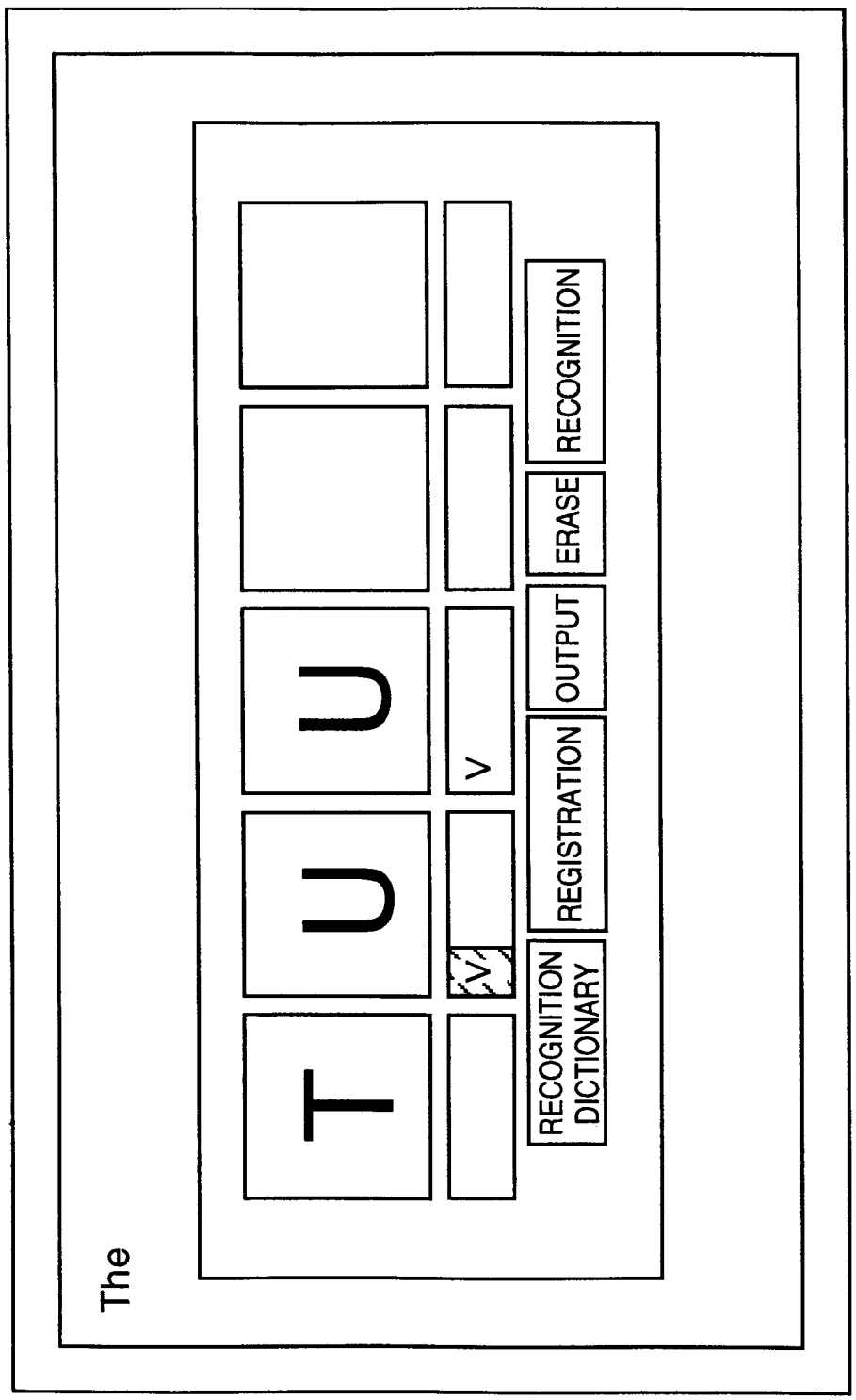
FIG. 25 is a diagram showing the results of recognizing the handwritten characters entered in FIG. 24 according to the first embodiment.
Figure 26:
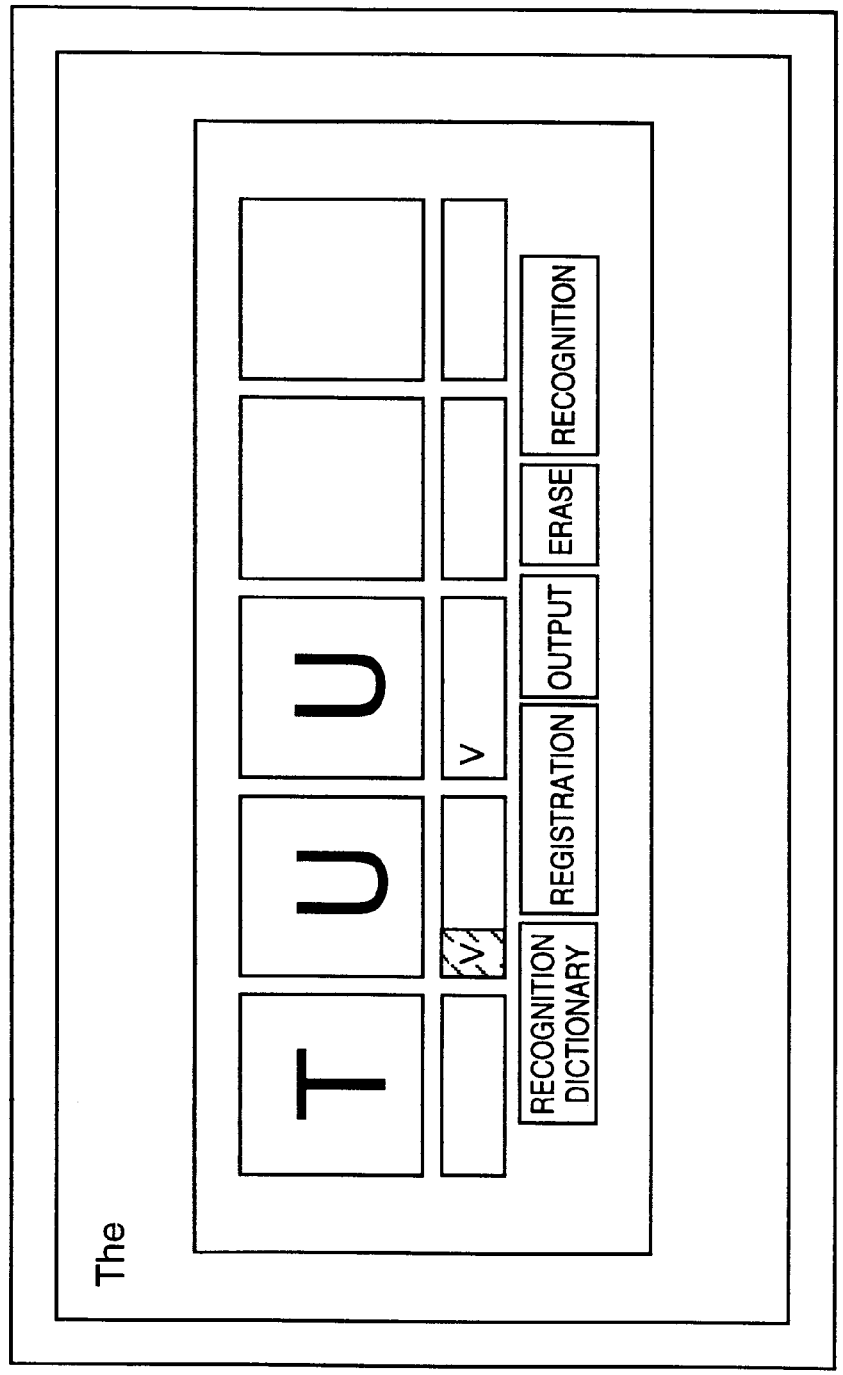
FIG. 26 is a diagram illustrating the results of completing a correction operation executed with regard to results of recognition obtained in FIG. 25 according to the first embodiment of the present invention.

FIGS. 24 through 26 are diagrams illustrating the manner in which handwritten characters have been entered on the character input panel 102a described with reference to FIGS. 7~9 in the earlier example regarding "わ" and "れ". The example of FIGS. 24~26 shows the user in the process of entering "The TUV . . . ", where "The" has already been stored and is being displayed on the display screen 400 and the handwritten input patterns 2401~2403 of "TUV" have been entered. The display areas and designation areas on the character input panel and the operation and display procedures are similar to those described in FIGS. 7 through 9.

A method of generating a synthesized pattern of "U" and "V" according to the second embodiment will be described with reference to FIGS. 28~30.

Figure 28A:
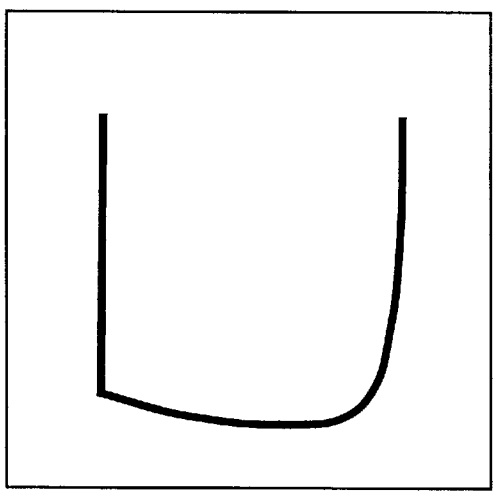
FIG. 28A is a diagram showing the standard stroke pattern of the character "U" of similar characters "U" and "V"
Figure 28B:
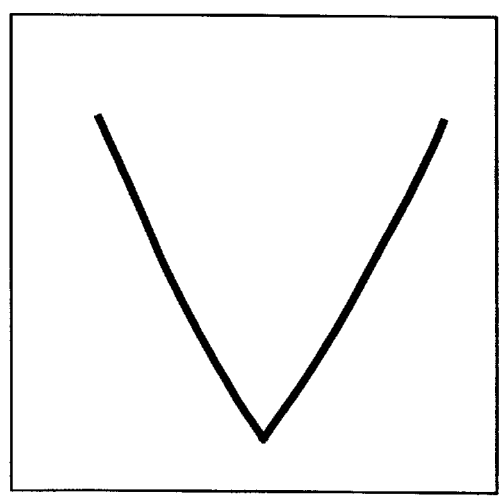
FIG. 28B is a diagram showing the standard stroke pattern of the character "V" of similar characters "U" and "V"

FIG. 28A is the standard stroke pattern of "U", and FIG. 28B is the standard stroke pattern of "V". FIG. 29 is a synthesized pattern obtained by combining the standard stroke patterns of "U" and "V" shown in FIG. 28. As shown in FIG. 29, "U" is divided into 14 equal segments from its starting point to its end point. Similarly, "V" is divided into 14 equal segments from its starting point to its end point. Furthermore, the corresponding partial stroke counterparts (1/14, 2/14, . . . 14/14), of these patterns are correlated and stored in the RAM 101.

Figure 29:
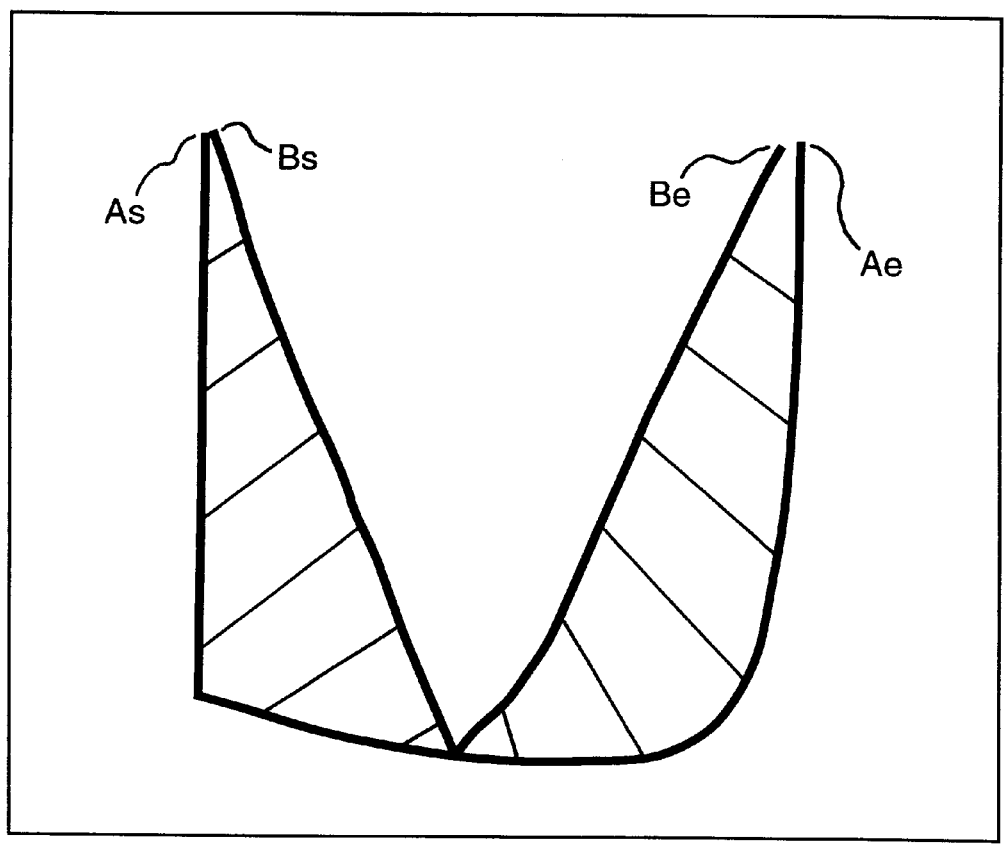
FIG. 29 is a diagram showing a synthesized pattern obtained by combining the stroke patterns of the characters "U" and "V" shown in FIG. 28 according to the second embodiment of the present invention.
Figure 30:
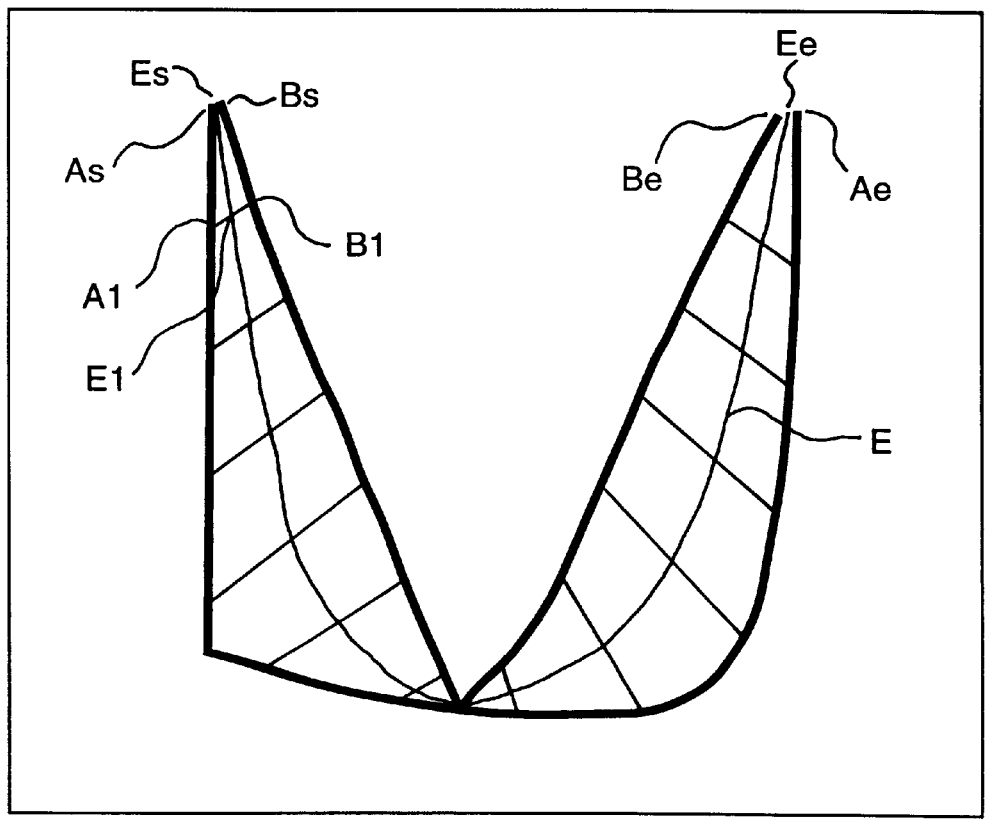
FIG. 30 is a diagram showing a desired intermediate pattern produced using the synthesized pattern depicted in FIG. 29 according to the second embodiment of the present invention.

FIG. 30 is a diagram showing a desired intermediate pattern produced by using the synthesized pattern depicted in FIG. 29.

Using the pen 11, the user enters the stroke E of the desired intermediate pattern on the display screen displaying the synthesized pattern.

As shown in FIG. 30, the stroke of this entered intermediate pattern is generated by extracting coordinate points as 14 divided partial strokes in the manner described earlier. The processing for generating this intermediate pattern is as described above in conjunction with the flowchart of FIG. 21.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Figure 22:
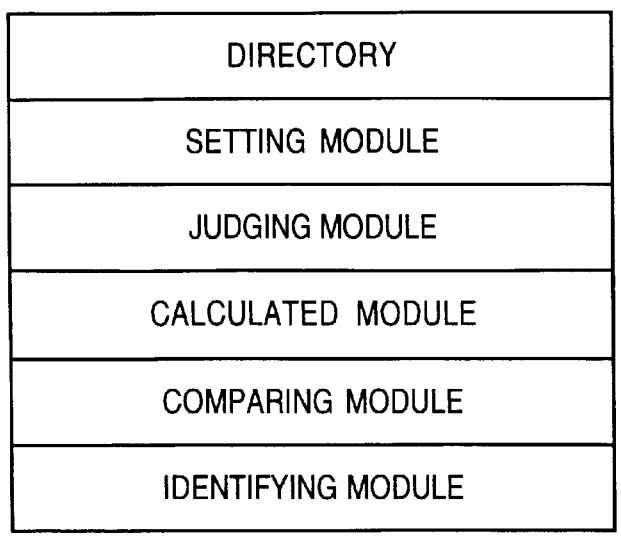
FIG. 22 is a diagram showing the structure of a memory map of a storage medium storing program codes for implementing the embodiments of the invention.

In a case where the present invention is applied to the above-mentioned storage medium, program codes corresponding to the flowcharts described earlier are stored on this storage medium. More specifically, modules illustrating an example of the memory map of FIG. 22 are stored on the storage medium.

Specifically, it will suffice to store program codes of at least a "setting module", a "judging module", a "calculating module", a "comparing module" and an "identifying module".

The "setting module" is for setting a desired threshold value for identifying similar characters, the "judging module," is for judging whether characters are similar characters, and the "calculating module" is for calculating a feature quantity between similar characters if the characters are judged to be similar characters.

The "comparison module" is for comparing the calculated feature quantity and the set threshold value of the similar characters, and the "identifying module" is for identifying a character, which has been judged to be a similar character, as any of the above-mentioned similar characters based upon the results of the comparison.

As many apparently widely different embodiments of the present invention can be made without departing from the spirit and scope thereof, it is to be understood that the invention is not limited to the specific embodiments thereof except as defined in the appended claims.

What is claimed is:

1. A character recognition apparatus for recognizing an entered pattern comprising:
    display means for displaying a plurality of patterns having a first and second pattern, wherein the plurality of patterns represent transformations of the first pattern transforming into the second pattern or vice versa;
    designation input means, arranged together with the display means, for selecting one of the displayed intermediate patterns between the first and second patterns, which is designated by a user, and assigning the first pattern to a selected intermediate pattern as a first group and the pattern immediately after the selected intermediate pattern to the second pattern as a second group;
    setting means for setting a feature quantity of the selected intermediate pattern as a threshold value for identifying said first and second patterns in a character recognition process;
    identifying means for identifying to which group the entered pattern belongs on the basis of said threshold value; and
    output means for outputting character code corresponding to the first or second pattern included in the group identified by said identifying means as a recognition result for the entered pattern.

2. The apparatus according to claim 1 wherein identifying means has
    judging means for judging whether the entered pattern is a similar character;
    calculating means for calculating a feature quantity of the entered pattern if said judging means has judged that the entered pattern is a similar character; and
    comparison means for comparing the feature quantity calculated by said calculating means and the threshold value set by said setting means.

3. The apparatus according to claim 1, further comprising memory means for storing the group of intermediate patterns.

4. The apparatus according to claim 1, further comprising acquisition means for recognizing the entered pattern and acquiring a character code that corresponds to the recognized pattern; and
    collating means for collating the character code acquired by said acquisition means and a character code of each character corresponding to a plurality of character groups of similar characters;
    wherein it is determined whether the entered pattern is a similar character based upon results of collation performed by said collating means.

5. The apparatus according to claim 1, wherein said setting means includes input means for allowing a user to enter a handwritten similar character;
    wherein a feature quantity of the handwritten similar character entered by the user is set as a threshold value.

6. The apparatus according to claim 5, wherein said input means has display means for displaying, in superimposed form, said first and second pattern;
    wherein the handwritten similar character is entered on said first and second pattern displayed in superimposed form on said display means.

7. A character recognition method of recognizing an entered pattern, comprising:
    a display step of displaying a plurality of patterns having a first and second pattern, wherein the plurality of patterns represent transformations as the first pattern transforming into the second pattern or vice versa;
    a designation input step of selecting one of the displayed intermediate patterns between the first and second patterns, which is designated by a user, and assigning the first pattern to a selected intermediate pattern as a first group and the pattern immediately after the selected intermediate pattern to the second pattern as a second group;
    a setting step of setting a feature quantity of the selected intermediate pattern as a threshold value for identifying said first and second pattern in a character recognition process;
    an identifying step of identifying to which group the entered pattern belongs on the basis of said threshold value; and
    an output step of outputting character code corresponding to the first or second pattern included in the group identified at said identifying step as a recognition result for the entered pattern.

8. The method according to claim 7 wherein said identifying step includes
    a judging step of judging whether the entered pattern is a similar character;
    a calculating step of calculating a feature quantity of the entered pattern if result of judgment at said judging step is that the entered pattern is a similar character; and a comparison step of comparing the feature quantity calculated at said calculating step and the threshold value set at said setting step.

9. The method according to claim 7, further comprising a storing step of storing the group of intermediate patterns.

10. The method according to claim 7, further comprising:

an acquisition step of recognizing the entered pattern and acquiring a character code that corresponds to the recognized pattern; and a collating step of collating the character code acquired at said acquisition step and a character code of each character of a plurality of character groups of similar characters;

wherein it is determined whether the entered pattern is a similar character based upon results of collation performed at said collating step.

11. The method according to claim 7, wherein said setting step includes an input step of allowing a user to enter a handwritten similar character;

wherein a feature quantity of the handwritten similar character entered by the user is set as a threshold value.

12. The method according to claim 11, wherein said input step includes a display step of displaying, in superimposed form, said first and second pattern;

wherein the handwritten similar character is entered on said first and second pattern displayed in superimposed form at said display step.

13. A computer readable memory storing program codes for character recognition processing, comprising:

a program code of display step of displaying a plurality having a first and second pattern, wherein the plurality of patterns represent transformations as the first pattern transforming into the second pattern or vice versa;

a program code of designation input step, arranged together with the display step, of selecting one of the displayed intermediate patterns between the first and second patterns, which is designated by a user, and assigning the first pattern to a selected intermediate pattern as a first group and the pattern immediately after the selected intermediate pattern to the second pattern as a second group;

a program code of setting step of setting a feature quantity of the selected intermediate pattern as a threshold value for identifying said first and second pattern in a character recognition process;

a program code of identifying step of identifying to which group the entered pattern belongs on the basis of said threshold value; and a program code of output step of outputting character code corresponding to the first or second pattern included in the group identified at said identifying step as a recognition result for the entered pattern.

* * * * *